US012619493B2

(12) United States Patent
Song et al.

(10) Patent No.: US 12,619,493 B2
(45) **Date of Patent: *May 5, 2026**

(54) FLEXIBLE BIT QUANTITIES FOR ERROR CORRECTION CODE (ECC) VALUES IN A MEMORY ENVIRONMENT

(71) Applicant: Micron Technology, Inc., Boise, ID (US)

(72) Inventors: Keun Soo Song, Boise, ID (US); Kang-Yong Kim, Boise, ID (US); Hyun Yoo Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,593

(22) Filed: Sep. 10, 2024

(65) Prior Publication Data

US 2025/0004875 A1 Jan. 2, 2025

Related U.S. Application Data

(63) Continuation of application No. 17/654,354, filed on Mar. 10, 2022, now Pat. No. 12,086,026.

(Continued)

(51) Int. Cl.
*G06F 11/10* (2006.01)
*G06F 3/06* (2006.01)

(52) U.S. Cl.
CPC ........ *G06F 11/1044* (2013.01); *G06F 3/0619* (2013.01); *G06F 3/0629* (2013.01); *G06F 3/0673* (2013.01)

(58) Field of Classification Search
CPC ............. G06F 11/1044; G06F 11/1048; G06F 3/0619; G06F 3/0629; G06F 3/0673
See application file for complete search history.

(56) References Cited

U.S. PATENT DOCUMENTS 6,704,230 B1 3/2004 Debrosse et al.
7,505,295 B1 3/2009 Nataraj et al.
(Continued)

FOREIGN PATENT DOCUMENTS

KR 20050064887 6/2005
KR 20180003468 1/2018
(Continued)

OTHER PUBLICATIONS

ECC Parity: A Technique for Efficient Memory Error Resilience for Multi-Channel Memory Systems by Jian and Kumar published by IEEE, Nov. 2014 https://ieeexplore.ieee.org/stamp/stamp.jsp?tp=&arnumber=7013071 (Year: 2014).*
(Continued)

*Primary Examiner* — Joseph O Schell
(74) *Attorney, Agent, or Firm* — Colby Nipper PLLC

(57) ABSTRACT

Described apparatuses and methods provide configurable error correction code (ECC) circuitry and schemes that can utilize a shared ECC engine between multiple memory banks of a memory, including a low-power double data rate (LPDDR) memory. A memory device may include one or more dies with multiple memory banks. The configurable ECC circuitry can use an ECC engine that services a memory bank by producing ECC values based on data stored in the memory bank when data-masking functionality is enabled. When data-masking functionality is disabled, the configurable ECC circuitry can use the shared ECC engine that services at least two memory banks by producing ECC values with a larger quantity of bits based on respective data stored in the at least two memory banks. By using the shared ECC engine responsive to the data-masking functionality being disabled, the ECC functionality can provide higher data reliability with lower die area utilization.

20 Claims, 14 Drawing Sheets

Related U.S. Application Data

(60) Provisional application No. 63/162,139, filed on Mar. 17, 2021.

(56) References Cited

U.S. PATENT DOCUMENTS

| | | | |
|---|---|---|---|
| 8,898,543 | B2 | 11/2014 | Jo et al. |
| 8,942,028 | B1 | 1/2015 | Hu |
| 10,275,306 | B1* | 4/2019 | MacLaren ........... G06F 11/1048 |
| 10,319,461 | B2 | 6/2019 | Kwon et al. |
| 10,482,947 | B2 | 11/2019 | Cox et al. |
| 11,048,583 | B1 | 6/2021 | Hokenmaier et al. |
| 11,170,868 | B2 | 11/2021 | Ryu et al. |
| 11,301,317 | B2 | 4/2022 | Kim et al. |
| 11,314,589 | B2 | 4/2022 | Bains et al. |
| 11,327,838 | B2 | 5/2022 | Park et al. |
| 11,385,832 | B2 | 7/2022 | Murayama |
| 11,416,335 | B2 | 8/2022 | Cho et al. |
| 11,687,407 | B2 | 6/2023 | Kim et al. |
| 11,907,544 | B2 | 2/2024 | Lee et al. |
| 12,086,026 | B2 | 9/2024 | Song et al. |
| 12,366,975 | B2 | 7/2025 | Lee et al. |
| 2004/0184327 | A1 | 9/2004 | Okuda |
| 2007/0133315 | A1 | 6/2007 | Kang et al. |
| 2008/0046796 | A1 | 2/2008 | Dell et al. |
| 2009/0049364 | A1 | 2/2009 | Jo et al. |
| 2011/0040924 | A1 | 2/2011 | Selinger |
| 2012/0060066 | A1 | 3/2012 | Nagadomi et al. |
| 2013/0019142 | A1* | 1/2013 | Teo ..................... G06F 11/1048 714/763 |
| 2013/0159812 | A1 | 6/2013 | Loh et al. |
| 2014/0164874 | A1 | 6/2014 | Franceschini et al. |
| 2015/0212885 | A1 | 7/2015 | Coteus et al. |
| 2015/0278017 | A1* | 10/2015 | Trezise ................ G06F 3/0683 714/764 |
| 2016/0004596 | A1 | 1/2016 | D'abreau |
| 2016/0026524 | A1 | 1/2016 | Hoya |
| 2016/0139837 | A1 | 5/2016 | Welker et al. |
| 2016/0147599 | A1 | 5/2016 | Kim |
| 2016/0283318 | A1* | 9/2016 | Das ..................... G06F 11/1048 |
| 2016/0301428 | A1 | 10/2016 | Andrade Costa et al. |
| 2016/0328286 | A1 | 11/2016 | Hoekstra et al. |
| 2017/0063401 | A1* | 3/2017 | Jeganathan ....... H03M 13/2909 |
| 2017/0123904 | A1* | 5/2017 | Park .................... G06F 11/1068 |
| 2017/0192704 | A1* | 7/2017 | Lee ..................... G06F 3/0679 |
| 2017/0322843 | A1 | 11/2017 | Hsu et al. |
| 2018/0210787 | A1 | 7/2018 | Bains et al. |
| 2019/0087263 | A1 | 3/2019 | Cha et al. |
| 2019/0140668 | A1 | 5/2019 | Kim et al. |
| 2019/0220352 | A1 | 7/2019 | Cha et al. |
| 2019/0294378 | A1 | 9/2019 | Ware et al. |
| 2019/0324854 | A1 | 10/2019 | Park et al. |
| 2020/0104205 | A1 | 4/2020 | Noguchi et al. |
| 2020/0135291 | A1 | 4/2020 | Takahashi et al. |
| 2020/0371869 | A1 | 11/2020 | Park et al. |
| 2021/0064461 | A1 | 3/2021 | Veches |
| 2022/0066655 | A1 | 3/2022 | Lee et al. |
| 2022/0066870 | A1 | 3/2022 | Choi et al. |
| 2022/0066874 | A1* | 3/2022 | Kim ..................... G06F 11/1068 |
| 2022/0229724 | A1* | 7/2022 | Bains .................. G06F 11/1072 |
| 2022/0300370 | A1 | 9/2022 | Song et al. |
| 2024/0192862 | A1 | 6/2024 | Lee et al. |

FOREIGN PATENT DOCUMENTS

| | | |
|---|---|---|
| KR | 20190049710 | 5/2019 |
| WO | 2022047040 | 3/2022 |
| WO | 2022047266 | 3/2022 |
| WO | 2022198193 | 9/2022 |

OTHER PUBLICATIONS

"Non-Final Office Action", U.S. Appl. No. 18/582,356, Oct. 1, 2024, 6 pages.

"Notice of Allowance", U.S. Appl. No. 18/582,356, Apr. 15, 2025, 7 pages.

"International Preliminary Report on Patentability", Application No. PCT/US2021/047766, Feb. 28, 2023, 7 pages.

"International Preliminary Report on Patentability", Application No. PCT/US2021/048112, Feb. 28, 2023, 7 pages.

"International Preliminary Report on Patentability", Application No. PCT/US2022/071134, Sep. 12, 2023, 7 pages.

"International Search Report and Written Opinion", Application No. PCT/US2022/071134, Jun. 30, 2022, 10 pages.

"International Search Report and Written Opinion", Application No. PCT/US2021/047766, Dec. 1, 2021, 11 pages.

"International Search Report and Written Opinion", Application No. PCT/US2021/048112, Dec. 23, 2021, 10 pages.

"Non-Final Office Action", U.S. Appl. No. 17/460,013, Jun. 7, 2023, 12 pages.

"Non-Final Office Action", U.S. Appl. No. 17/654,354, Oct. 31, 2023, 22 pages.

"Non-Final Office Action", U.S. Appl. No. 17/412,050, Nov. 3, 2022, 15 pages.

"Notice of Allowance", U.S. Appl. No. 17/412,050, Feb. 16, 2023, 6 pages.

"Notice of Allowance", U.S. Appl. No. 17/460,013, Oct. 12, 2023, 5 pages.

"Notice of Allowance", U.S. Appl. No. 17/654,354, May 2, 2024, 7 pages.

"Wikipedia—Error Correction Code", Retrieved at: https://en.wikipedia.org/w/index.php?title=Error_correction_code&oldid=1006762637—on Feb. 24, 2021, 13 pages.

"Wikipedia—LPDDR", Retrieved at: https://en.wikipedia.org/w/index.php?title=LPDDR&oldid=1 008658262—on Feb. 24, 2021, 6 pages.

O, et al., "Exploring Energy-Efficient DRAM Array Organizations", IEEE 54th International Midwest Symposium on Circuits and Systems https://ieeexplore.ieee.org/stamp/stamp.jsp?arnumber=6026486, Sep. 2011, 4 pages.

* cited by examiner

100

Figure 5:
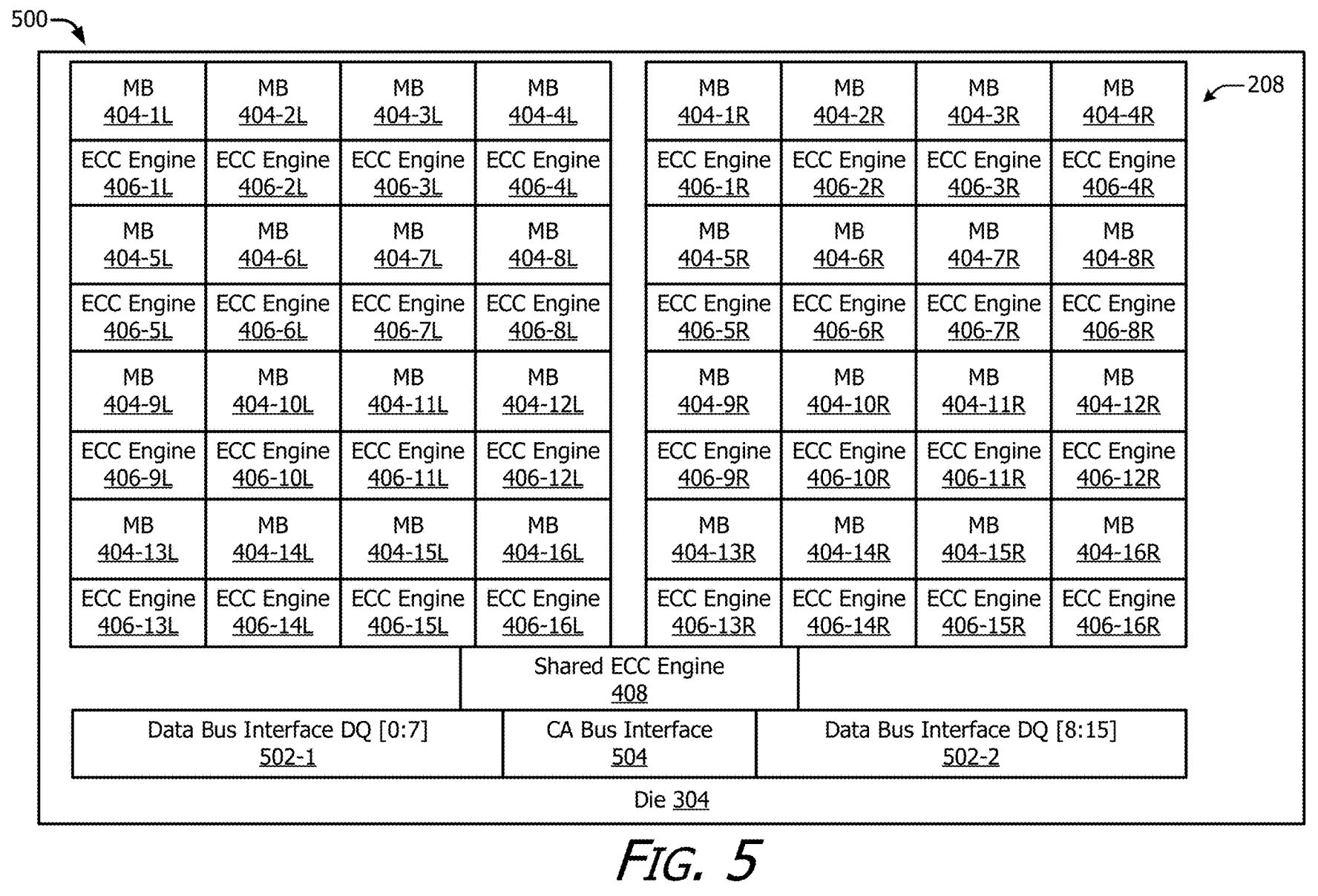

| MB 404-1L | ECC Engine 406-2L | MB 404-3L | ECC Engine 406-4L | MB 404-1R | ECC Engine 406-1R | MB 404-2R | MB 404-3R | MB 404-4R |
| ECC Engine 406-1L | MB 404-2L | ECC Engine 406-3L | MB 404-4L | ECC Engine 406-1R | MB 404-1R | ECC Engine 406-2R | ECC Engine 406-3R | ECC Engine 406-4R |

Die 304

Shared ECC Engine 408

Data Bus Interface DQ [0:7] 502-1

CA Bus Interface 504

Data Bus Interface DQ [8:15] 502-2

700

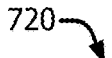
720
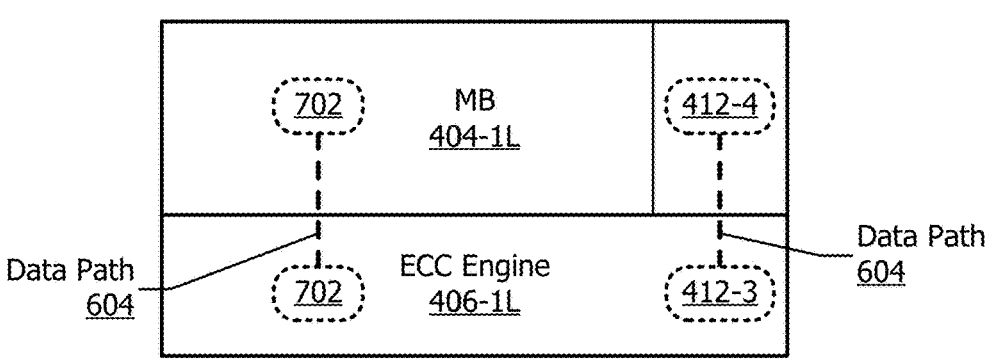
*FIG. 7-2*
730
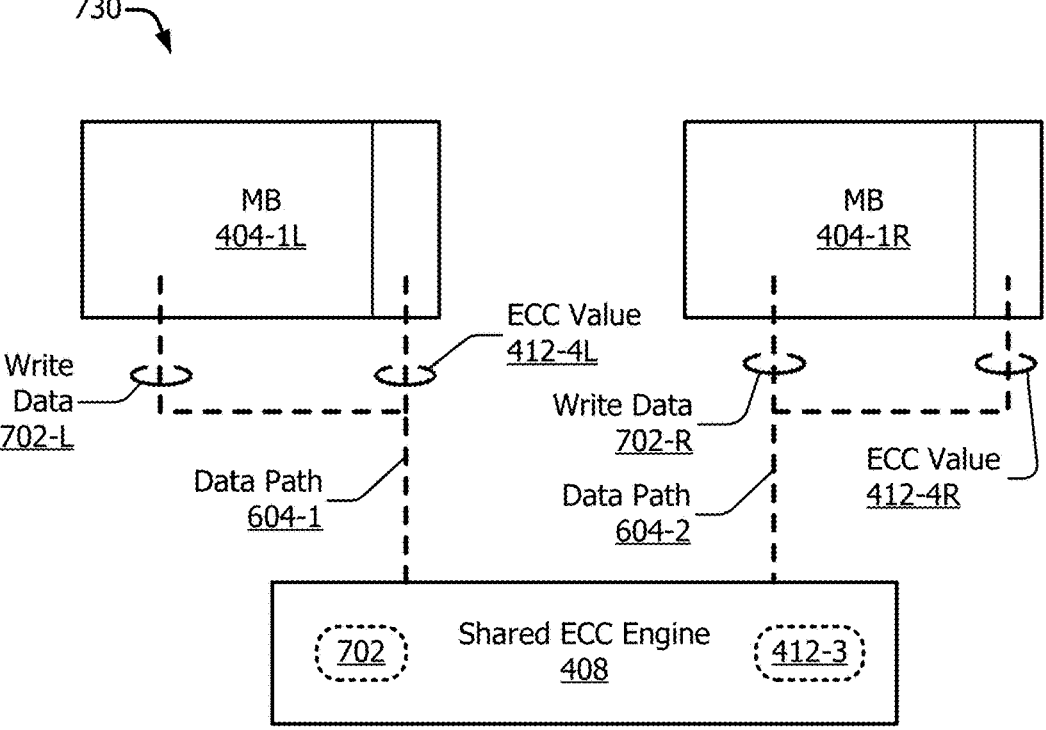
*FIG. 7-3*

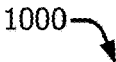

1000

Determine, by a first error correction code (ECC) engine, a first ECC value based on first data

1002

↓

Write the first ECC value to a first memory bank

1004

↓

Determine, by a second ECC engine, a second ECC value based on second data

1006

↓

Write the second ECC value to a second memory bank

1008

↓

Determine, by a third ECC engine, a third ECC value based on third data

1010

↓

Write a first portion of the third ECC value to the first memory bank and a second portion of the third ECC value to the second memory bank

Transmit a first write command and a first error correction code (ECC) value to a memory device, the first ECC value having a first quantity of bits

1102

Transmit a command to disable a masked-write functionality of the memory device

1104

Transmit a second write command and a second ECC value to the memory device, the second ECC value having a second quantity of bits

1106

1200 ⌐

Receive a first write command and a first
error correction code (ECC) value, the first
ECC value having a first quantity of bits

1202

Receive a command to disable a masked-write functionality
1204

Receive a second write command and a second ECC value,
the second ECC value having a second quantity of bits

1206

FLEXIBLE BIT QUANTITIES FOR ERROR CORRECTION CODE (ECC) VALUES IN A MEMORY ENVIRONMENT

CROSS-REFERENCE TO RELATED APPLICATION(S)

This application is a continuation of and claims priority to U.S. Non-Provisional patent application Ser. No. 17/654,354, filed on 10 Mar. 2022, which in turn claims the benefit of U.S. Provisional Patent Application No. 63/162,139, filed 17 Mar. 2021, the disclosures of which are hereby incorporated by reference herein in their entireties.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random access memory (RAM)) and nonvolatile memory (e.g., flash memory). Volatile memory can include static RAM (SRAM) and dynamic RAM (DRAM). Like the number of cores or speed of a processor, memory characteristics that vary by memory type can impact an electronic device's performance.

Memory demands in electronic devices continue to evolve and grow. For example, as manufacturers engineer processors to execute code faster, processors benefit from accessing memories more quickly. Applications on electronic devices may also operate on ever-larger data sets that require ever-larger memories. Further, manufacturers may seek physically smaller memories with smaller process technologies as the form factors of portable electronic devices continue to shrink. Accommodating these various demands is complicated by a growing demand to improve the accurate storing and retrieval of data by memories.

BRIEF DESCRIPTION OF THE DRAWINGS

This document describes apparatuses and techniques for configurable error correction code (ECC) circuitry with reference to the following drawings. The same numbers are used throughout the drawings to reference like features and components:

FIG. 5 illustrates an example architecture for a memory device that includes configurable ECC circuitry and multiple memory banks;

FIGS. 7-1 through 7-4 illustrate example operations of configurable ECC circuitry and schemes for read operations and write operations in accordance with example protocols;

FIGS. 10 through 12 illustrate flow diagrams of example processes that implement configurable ECC circuitry and schemes.

DETAILED DESCRIPTION

Overview

Figure 1:
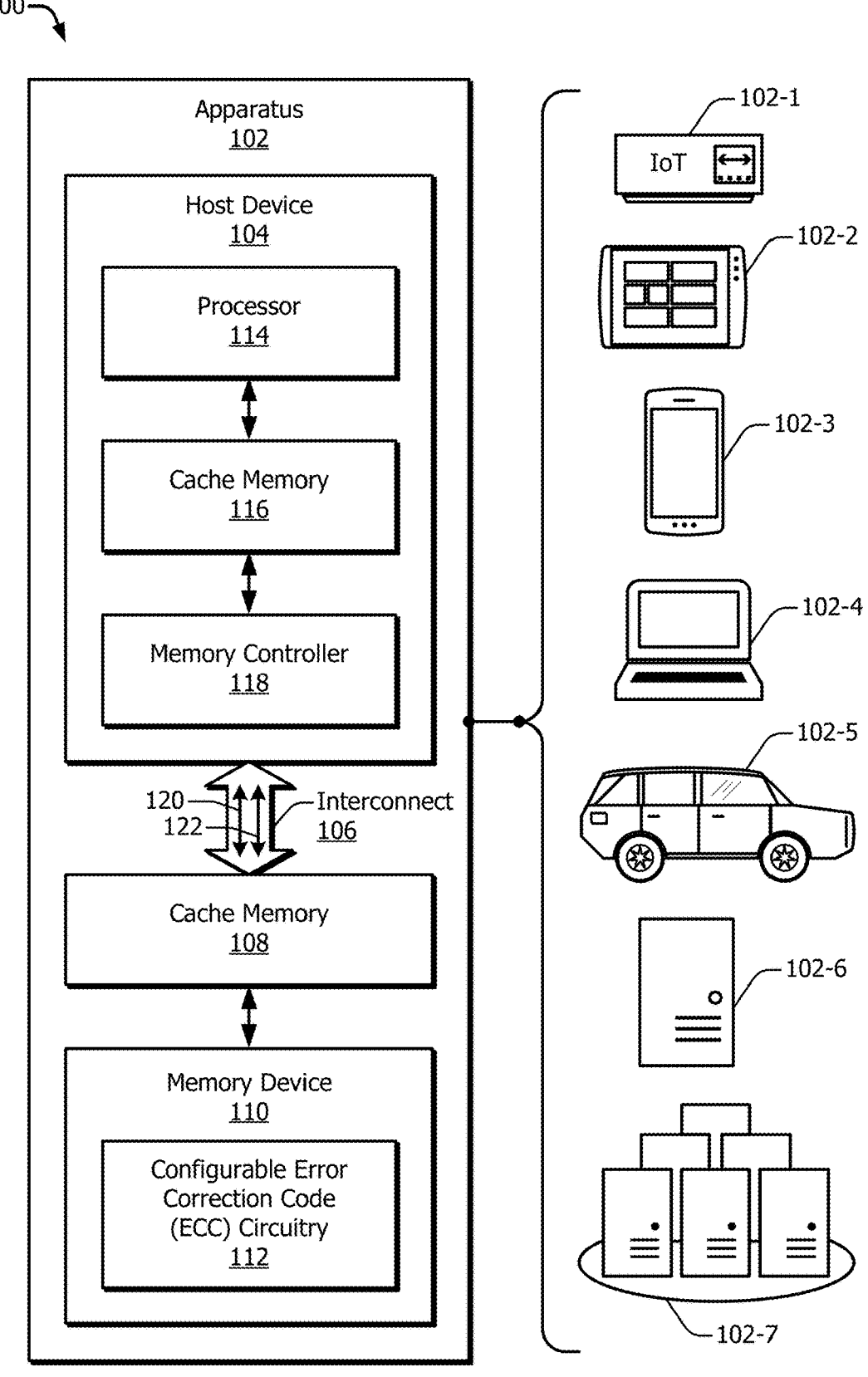
FIG. 1 illustrates example apparatuses that can implement configurable ECC circuitry and schemes.

Processors and memory work in tandem to provide features on computers and other electronic devices, including smartphones. An electronic device can generally provide enhanced features, such as high-resolution graphics and artificial intelligence, as a processor-and-memory tandem operate faster. Advances in processors have often outpaced those in memory. As a result, memory can cause a bottleneck during execution due to the disparity in speed between processors and memory.

To counterbalance the faster operational speed of processors, computer engineers have developed several techniques to improve memory performance. One such technique involves accessing multiple memories in parallel. Manufacturers can design a memory device with multiple memory banks to enable parallel accessing. The memory device can access each memory bank in parallel with one or more other memory banks, multiplying the data-access rate. Consider that each memory bank of a four-banked memory device can read a byte of data substantially simultaneously. The four-banked memory device may then produce four bytes of data in the same time that a non-banked memory produces only one byte of data.

Access circuitry or logic associated with each memory bank can operate separately, at least in part, from the access circuitry of other memory banks to enable simultaneous data reading (e.g., extracting a byte of information from memory cells). As a result, the memory device may replicate access circuitry for each memory bank of multiple memory banks. Manufacturers of memory devices position the replicated access circuitry proximate to each memory bank to reduce data-reading latency. Co-locating access circuitry and memory banks, however, can constrain systems and techniques that are used for memory safety and reliability, including error correction and detection using error-correction-code (ECC) technology. This Overview further describes ECC technology after introducing example memory types.

There are multiple types of dynamic random-access memory (DRAM). As one example, low-power double data rate (DDR) memory, also referred to as LPDDR or mobile DDR, is a DDR synchronous DRAM (DDR SDRAM). LPDDR generally uses less power than other types of DDR SDRAM. In some applications, LPDDR memory may also operate at higher data rates than other DDR SDRAM types. Device manufacturers often use LPDDR memory in mobile devices, such as smartphones and tablet computers, to extend battery life. Cloud and web-services companies increasingly use LPDDR memory in server applications to reduce electricity usage and, therefore, lower operational costs across large data centers. Designing LPDDR for different use cases and applications, however, can be challenging.

Computer engineers can construct LPDDR memory with different data array topologies for different applications. Memory designs may improve power efficiency or area efficiency. Other design considerations may address the size and shape of the LPDDR memory. Some features supported by an LPDDR architecture, however, can restrict design flexibility by, for example, limiting available data array topologies, occupying additional die space, requiring additional on-die wiring or data paths, or requiring additional components or logic, such as additional or redundant ECC circuitry.

LPDDR memory may include various error-correction logic based on ECC techniques. For example, an ECC engine may generate an 8-bit ECC value for 128 bits of data, also referred to as a 128:8 ECC engine. The 128:8 ECC engine may be able to detect double-bit errors and correct single-bit errors. As another example, the error-correction logic may generate a 16-bit ECC value for a 256-bit data package and be capable of detecting larger bit errors or more reliably detecting double-bit errors. Using ECC technology can reduce the effects of data corruption and may improve memory and system performance. Generally, as the bit size of the ECC value increases, the error detection coverage in a memory device increases. Also, on-die error-correction logic can increase the reliability of DDR SDRAM, including LPDDR SDRAM.

Computer engineers can implement error-correction logic using ECC mechanisms with an ECC engine that determines ECC values on data portions (e.g., some quantity of bytes). As mobile devices become more powerful or provide more important services, memory reliability improvements become more critical to users, hardware designers, and application designers. Improved error correction capabilities, such as ECC values with larger bit sizes, can increase on-die error detection. This document describes techniques and systems to enable such more robust ECC data protection, including a configurable ECC logic shared among multiple memory banks of an LPDDR memory with a reduced die-area penalty while offering increased ECC protection.

As discussed above, multi-banked memory has evolved to include dedicated access circuitry per memory bank positioned proximate to each memory bank. The dedicated access circuitry may include sense amps, pre-charge circuits, column address circuitry, buffers, routing circuitry, and ECC circuitry. Engineers can include an ECC engine in the ECC circuitry for each respective memory bank in some approaches. Engineers may position one ECC "block" or contiguous die region between two memory banks in some chip layouts. The ECC block can include two ECC engines-one ECC engine per memory bank. With these approaches, an ECC engine is present for each memory bank, and each ECC engine uses 128:8 ECC technology to conserve die area. Compared to a 128:8 ECC engine, a 256:16 ECC engine can occupy significantly more die area (e.g., twice the die area). As a result, it may be impractical to provide 256:16 ECC engines positioned proximate to each memory bank of a memory array.

In other cases, a DDR architecture, protocol, or feature may adversely impact performance. For example, a masked-write command allows memory to write a group of bits (e.g., 64 bits) while masking some of the bits (e.g., 8 bits), which may be called the "masked bits." The masked bits retain their previous value instead of being overwritten by the masked-write operation.

The internal read-modify-write operation can be considered an "atomic" operation formed of three operations. The operations may include reading existing data at a location and modifying the write data for the write command in light of the mask and the read data. As part of the read or modify operation, the memory may use ECC circuitry to detect or correct an error in the masked data. Placing an ECC engine near each memory bank can mitigate propagation delays for the data portion undergoing ECC processing. After the modifying, the internal read-modify-write operation writes the modified group of bits such that the masked data is unchanged. The atomic read-modify-write operation may also entail a second ECC determination for the modified group of bits that is being written.

Performing multiple access operations can cause timing constraints in the memory system because the internal read-modify-write operation can take longer than implementing a standard or non-masked write command. Further, additional control circuitry is employed to perform read-modify-write operations. Because of the timing constraints and the additional control circuitry, implementing the masked-write feature can involve providing at least one dedicated ECC engine for each memory bank of an LPDDR memory. The dedicated ECC engines consume valuable die space but may be important for LPDDR memory that supports data-masking functionality to lower latency to meet a given memory specification.

As indicated above, the portion of access-control circuitry for performing masked-write operations can be relatively large. This circuitry can reduce the area available for other control circuitry or additional memory capacity to improve device operation. For example, it can be challenging to add ECC circuitry that interacts with multiple memory banks due to chip layout limitations, which are exacerbated by enabling masked-write operations. Instead, a separate ECC engine is often built for each memory bank to reduce data paths among the memory banks. This approach, however, can introduce two drawbacks. First, computer engineers replicate an ECC engine in multiple locations, which wastes the limited chip die area. Second, because the ECC engine is replicated, it can be problematic from a cost or area perspective to utilize more-complex ECC engines.

To address these issues at least partially, this document describes other approaches in which ECC circuitry is configurable to use a shared ECC engine in conjunction with local ECC engines to provide higher data reliability. For example, the local ECC engines can provide 128:8 ECC functionality to the respective memory bank of a memory array. In this example, the shared ECC engine can provide 256:16 ECC functionality to two or more memory banks of the memory array and improved error detection relative to 128:8 ECC functionality. As another example, the shared ECC engine can use a portion of communicated data to improve detection of two-bit errors to the memory banks by using ECC values with a larger quantity of bits (e.g., 10, 12, 14, or 16 bits instead of 8 bits).

For example, a first ECC engine of the configurable ECC circuitry can correspond to a first memory bank of multiple memory banks and provide ECC determinations (e.g., computations) for data stored in the first memory bank. A second ECC engine can correspond to a second memory bank and provide ECC determinations for data stored in the second memory bank. A third ECC engine (e.g., a shared ECC engine) can correspond to the first memory bank and the second memory bank and provide ECC determinations for data stored in the first memory bank and for data stored in the second memory bank. In operation, the first ECC engine provides a first ECC value for the first memory bank. The second ECC engine provides a second ECC value for the second memory bank. The first ECC value and the second ECC value have a first quantity of bits. The shared ECC engine provides a third ECC value for at least one of the first memory bank or the second memory bank. The third ECC value has a second quantity of bits, which is larger than the first quantity. Using a shared ECC engine, ECC technology that uses ECC values with more bits than those of the local ECC engines can be employed in a memory device. With larger quantities of bits in the ECC values, higher levels of error detection or correction can be implemented to provide greater data reliability than per-memory-bank ECC approaches.

Accordingly, this document describes approaches for configurable ECC circuitry and schemes with better error coverage within a given die size. Many applications and use cases rarely employ the masked-write functionality. The memory device can include the shared ECC engine without incurring an appreciable die-area penalty by selectively disabling the masked-write functionality and utilizing global data lines. The shared ECC engine can use an ECC value with more bits than the local ECC engines because there are fewer instances of the larger shared ECC engine (e.g., as few as a single instance) as compared to multiple instances of the local ECC engines. In this way, the masked-write functionality can still be selectively available and supported by local ECC engines to meet latency targets, but the memory device can also provide better error coverage when the masked-write functionality is disabled by using the shared ECC engine.

The wiring that extends from multiple memory banks (e.g., for byte-mode functionality) can also couple to the shared ECC engine. Because the shared ECC engine does not need to be replicated across the die at each memory bank, configurable ECC circuitry can be implemented with greater error-detection coverage without an infeasible area penalty. The shared ECC engine can provide higher-order reliability by using ECC values with larger bit sizes. Therefore, memory devices can be "upgraded" from using ECC values of a first size (e.g., 8 bits) to using larger ECC values (e.g., 10-bit, 12-bit, 14-bit, or 16-bit) without appreciably increasing the die size or cost and without omitting masked-write functionality. In this way, the detectability of two-bit errors can increase to over ninety percent in some cases. Further, by using the shared ECC engine when the masked-write functionality is disabled, the memory device can avoid signal propagation delays between a memory bank and a shared ECC engine that might adversely impact a read-modify-write operation.

Thus, if masked-write commands and the corresponding internal read-modify-write operations are selectively disabled, the associated timing constraints or control complexity can be reduced or eliminated. In such situations, memory designers can more feasibly implement larger ECC values with an ECC engine shared across multiple memory banks in a memory device. Using the shared ECC engine can provide better error detection and increased data reliability relative to per-bank or dedicated ECC mechanisms that are used when masked-write functionality is enabled. Employing configurable ECC circuitry and schemes that can respond to the enabling or disabling of masked-write functionality suitable to a given application or use case can improve memory performance. Thus, flexibility in enabling masked-write functionality and the size of ECC values may improve the rate of data failure detections or corrections.

This document, therefore, describes memory device approaches that utilize configurable ECC circuitry and schemes. Local ECC engines may service respective memory banks on a given memory die with ECC values of a first size. An ECC engine shared across two or more memory banks may use ECC values of a second size, which is larger than the first size. For example, the shared ECC engine may service two or more memory banks on the given memory die using ECC values with larger second size. The memory device can improve error detection at least when masked-write functionality is disabled without an appreciable die area penalty. In these manners, the configurable ECC circuitry and schemes can increase data reliability, decrease die area that would otherwise be devoted to higher-order ECC functionality, increase chip-topology flexibility, or provide other features and benefits described herein.

Example Operating Environments

FIG. 1 illustrates, at 100 generally, an example apparatus 102 that can implement configurable error correction code (ECC) circuitry and schemes. The apparatus 102 can include various types of electronic devices, including an internet-of-things (IoT) device 102-1, tablet device 102-2, smartphone 102-3, notebook computer 102-4, passenger vehicle 102-5, server computer 102-6, server cluster 102-7 that may be part of cloud computing infrastructure or a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, at least one cache memory 108, and at least one memory device 110. The host device 104 can include at least one processor 114, at least one cache memory 116, and at least one memory controller 118. The memory device 110, which can be also be a memory module, can include, for example, a dynamic random-access memory (DRAM) die or module (e.g., LPDDR SDRAM). The DRAM die or module can include a three-dimensional (3D) stacked DRAM device, which may be a high-bandwidth memory (HBM) device or a hybrid memory cube (HMC) device. The memory device 110 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 114 is operatively coupled to the cache memory 116, which is operatively coupled to the memory controller 118. The processor 114 is also coupled, directly or indirectly, to the memory controller 118. The host device 104 may include other components to form, for instance, a system-on-a-chip (SoC). The processor 114 may include a general-purpose processor, central processing unit (CPU), graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 118 can provide a high-level or logical interface between the processor 114 and at least one memory (e.g., an external memory). The memory controller 118 can, for example, receive memory requests from the processor 114 and provide the memory requests to external memory with appropriate formatting, timing, and reordering. The memory controller 118 can also forward to the processor 114 responses to the memory requests received from external memory.

The host device 104 is operatively coupled, via the interconnect 106, to the cache memory 108, which may be operatively coupled to the memory device 110. In some examples, the memory device 110 is connected to the host device 104 via the interconnect 106 without an intervening buffer or cache, such as without the cache 108. The memory device 110 may operatively couple to storage memory (not shown). The host device 104 can also be coupled, directly or indirectly via the interconnect 106, to the memory device 110 and the storage memory. The interconnect 106 and other interconnects (not illustrated in FIG. 1) can transfer data between two or more components of the apparatus 102. Examples of the interconnect 106 include a bus, switching fabric, or one or more wires that carry voltage or current signals.

The interconnect 106 can include at least one command and address bus 120 (CA bus 120) and at least one data bus 122 (DQ bus 122). Each bus may be a unidirectional or a bidirectional bus. The CA bus 120 and the DQ bus 122 may couple to CA and DQ pins, respectively, of the memory device 110. In some implementations, the interconnect 106 may also include a chip-select (CS) I/O (not illustrated in FIG. 1) that can, for example, couple to one or more CS pins of the memory device 110. The interconnect 106 may also include a clock bus (CK bus—not illustrated in FIG. 1) that is part of or separate from the CA bus 120.

The illustrated components of the apparatus 102 represent an example architecture with a hierarchical memory system. A hierarchical memory system may include memories at different levels, with each level having memory with a different speed or capacity. As illustrated, the cache memory 116 logically couples the processor 114 to the cache memory 108. The cache memories 108 and 116 logically couple the processor 114 to the memory device 110. In the illustrated implementation, the cache memory 116 is at a higher level than the cache memory 108. Similarly, the cache memory 108 is at a higher level than the memory device 110. A storage memory, in turn, can be at a lower level than the main memory (e.g., the memory device 110). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 114 or the memory controller 118. A memory (e.g., the memory device 110) may have an "internal" or "local" cache memory. As another example, the apparatus 102 may not include cache memory between the interconnect 106 and the memory device 110. Computer engineers can also include the illustrated components in distributed or shared memory systems.

Computer engineers may implement the host device 104 and the various memories in multiple manners. In some cases, the host device 104 and the memory device 110 can be disposed on, or physically supported by, a PCB (e.g., a rigid or flexible motherboard). The host device 104 and the memory device 110 may additionally be integrated on an IC or fabricated on separate ICs packaged together. The memory device 110 may also be coupled to multiple host devices 104 via one or more interconnects 106 and may respond to memory requests from two or more host devices 104. Each host device 104 may include a respective memory controller 118, or the multiple host devices 104 may share a memory controller 118. This document describes an example computing system architecture with at least one host device 104 coupled to the memory device 110 with reference to FIG. 2.

Two or more memory components (e.g., modules, dies, banks, or bank groups) can share the electrical paths or couplings of the interconnect 106. In some implementations, the CA bus 120 transmits addresses and commands from the memory controller 118 to the memory device 110, which may exclude propagating data. The DQ bus 122 can propagate data between the memory controller 118 and the memory device 110. The memory device 110 may include multiple memory banks (not illustrated in FIG. 1). The memory device 110 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 110 can form at least part of the main memory of the apparatus 102. The memory device 110 may, however, form at least part of a cache memory, a storage memory, or an SoC of the apparatus 102. As described further below, the architecture or protocol of the memory device 110 can selectively enable or disable masked-write functionality or byte-mode functionality. The architecture or protocol of the memory device 110 can also select the bit-size of ECC values in some implementations.

As illustrated in FIG. 1, the memory device 110 can include configurable error correction code (ECC) circuitry 112, which may include multiple ECC engines (not illustrated in FIG. 1). The configurable ECC circuitry 112, or the ECC engines thereof, can be realized as hardware (e.g., logic) that implements an ECC algorithm or other mechanism. In some implementations, the configurable ECC circuitry 112 can include multiple portions, with each portion allocated to a respective memory bank or set of memory banks of the memory device 110. The configurable ECC circuitry 112 can also include a portion shared between two or more of the memory banks of the memory device 110. The configurable ECC circuitry 112 can perform error corrections, error detections, or both. The hardware or logic of the configurable ECC circuitry 112 may implement, for example, a double-error correction (DEC) Bose-Chaudhuri-Hocquenghem (BCH) code or a double-error-correcting and triple-error-detecting (DEC-TED) BCH code. Other ECC algorithms and mechanisms are described below.

Figure 2:
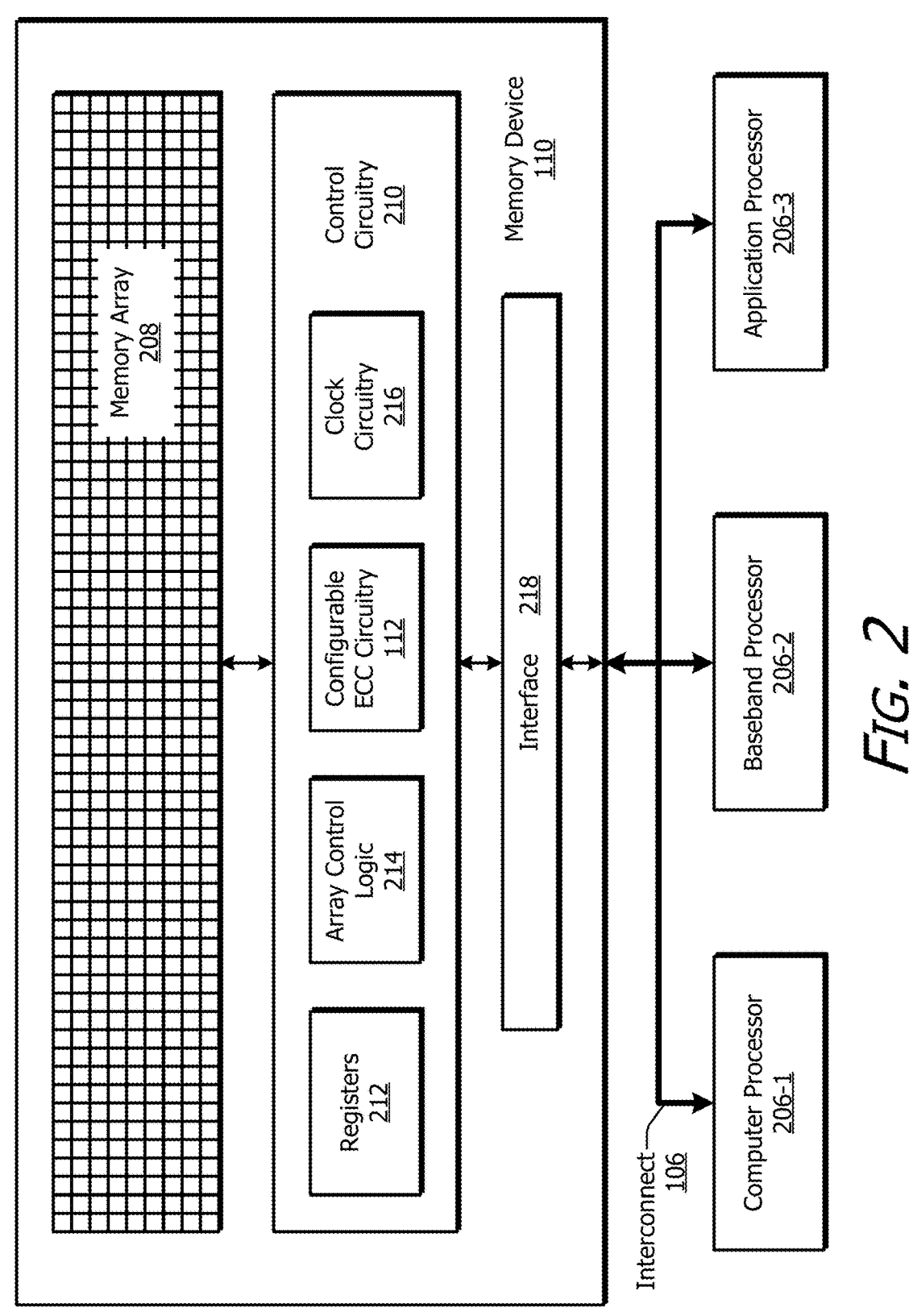
FIG. 2 illustrates an example computing system that can implement aspects of configurable ECC circuitry and schemes with a memory device.

FIG. 2 illustrates an example computing system 200 that can implement aspects of configurable ECC circuitry and schemes. In some implementations, the computing system 200 includes at least one memory device 110, at least one interconnect 106, and at least one processor 206. The memory device 110 can include, or be associated with, at least one memory array 208, at least one interface 218, and control circuitry 210 operatively coupled to the memory array 208. The memory device 110 can correspond to one or more of the cache memory 108 or 116, the main memory, or a storage memory of the apparatus 102 of FIG. 1. Thus, the memory array 208 can include an array of memory cells, including but not limited to memory cells of DRAM, SDRAM, 3D-stacked DRAM, DDR memory, low-power DRAM, or LPDDR SDRAM. For example, the memory array 208 can include memory cells of SDRAM configured as a memory module with one channel containing either 16 or 8 data (DQ) signals, double-data-rate input/output (I/O) signaling, and supporting a supply voltage of 0.3 to 0.5V. The density of the memory device 110 can range, for instance, from 2 Gb to 32 Gb. The memory array 208 and the control circuitry 210 may be components on a single semiconductor die or on separate semiconductor dies. The memory array 208 or the control circuitry 210 may also be distributed across multiple dies.

The control circuitry 210 can include various components that the memory device 110 can use to perform various operations. These operations can include communicating with other devices, managing memory performance, and performing memory read or write operations. For example, the control circuitry 210 can include one or more registers 212, at least one instance of array control logic 214, clock circuitry 216, and the configurable ECC circuitry 112. The registers 212 may be implemented, for example, as one or more registers (e.g., a masked-write enablement register) that can store information to be used by the control circuitry 210 or another part of the memory device 110. The array control logic 214 can be circuitry that provides command decoding, address decoding, input/output functions, amplification circuitry, power supply management, power control modes, and other functions. The clock circuitry 216 can synchronize various memory components with one or more external clock signals provided over the interconnect 106, including a command/address clock (e.g., CK_t or CK_c) or a data clock (e.g., WCK_t or WCK_c). The clock circuitry 216 can also use an internal clock signal to synchronize memory components.

The interface 218 can couple the control circuitry 210 or the memory array 208 directly or indirectly to the interconnect 106. As shown in FIG. 2, the registers 212, the array control logic 214, the configurable ECC circuitry 112, and the clock circuitry 216 can be part of a single component (e.g., the control circuitry 210). In other implementations, one or more of the registers 212, the array control logic 214, the configurable ECC circuitry 112, or the clock circuitry 216 may be separate components on a single semiconductor die or across multiple semiconductor dies. These components may individually or jointly couple to the interconnect 106 via the interface 218.

The interconnect 106 may use one or more of a variety of interconnects that communicatively couple together various components and enable commands, addresses, or other information and data to be transferred between two or more components (e.g., between the memory device 110 and the processor 206). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a CA bus 120 and a DQ bus 122 (as illustrated in FIG. 1).

In some aspects, the memory device 110 may be a "separate" component relative to the host device 104 (of FIG. 1) or any of the processors 206. The separate components can include a PCB, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 110 may be integrated with other physical components, including the host device 104 or the processor 206, by being combined on a PCB or in a single package or an SoC.

The designed apparatuses and methods may be appropriate for memory designed for lower-power operations or energy-efficient applications. An example of a memory standard related to low-power applications is the LPDDR standard for SDRAM as promulgated by the Joint Electron Device Engineering Council (JEDEC) Solid State Technology Association. In this document, some terminology may draw from one or more of these standards or versions thereof, like the LPDDR5 standard, for clarity. The described principles, however, are also applicable to memories that comport with other standards, including other LPDDR standards (e.g., earlier versions or future versions like LPDDR6) and to memories that do not adhere to a standard.

As shown in FIG. 2, the processors 206 may include a computer processor 206-1, a baseband processor 206-2, and an application processor 206-3, coupled to the memory device 110 through the interconnect 106. The processors 206 may include or form a part of a CPU, GPU, SoC, ASIC, or FPGA. In some cases, a single processor can comprise multiple processing resources, each dedicated to different functions (e.g., modem management, applications, graphics, central processing). In some implementations, the baseband processor 206-2 may include or be coupled to a modem (not illustrated in FIG. 2) and referred to as a modem processor. The modem or the baseband processor 206-2 may be coupled wirelessly to a network via, for example, cellular, Wi-Fi®, Bluetooth®, near field, or another technology or protocol for wireless communication.

In some implementations, the processors 206 may be connected directly to the memory device 110 (e.g., via the interconnect 106). In other implementations, one or more of the processors 206 may be indirectly connected to the memory device 110 (e.g., over a network connection or through one or more other devices). Further, the processor 206 may be realized similar to the processor 114 of FIG. 1. Accordingly, a respective processor 206 can include or be associated with a respective memory controller, like the memory controller 118 illustrated in FIG. 1. Alternatively, two or more processors 206 may access the memory device 110 using a shared memory controller 118.

The configurable ECC circuitry 112 can provide ECC functionality for data stored in the memory array 208. The configurable ECC circuitry 112 can determine an ECC value for storage as part of a write operation or for comparison with a stored ECC value as part of a read operation. Example operations of the configurable ECC circuitry 112 are described below with reference to FIGS. 4 through 8. Example implementations in which the memory array 208 includes multiple memory banks are presented below with reference to FIGS. 4 through 8. Example architectures for internal data buses are described with reference to FIG. 6. Example hardware realizations of a memory device 110 are described next with reference to FIG. 3.

Example Techniques and Hardware

Figure 3:
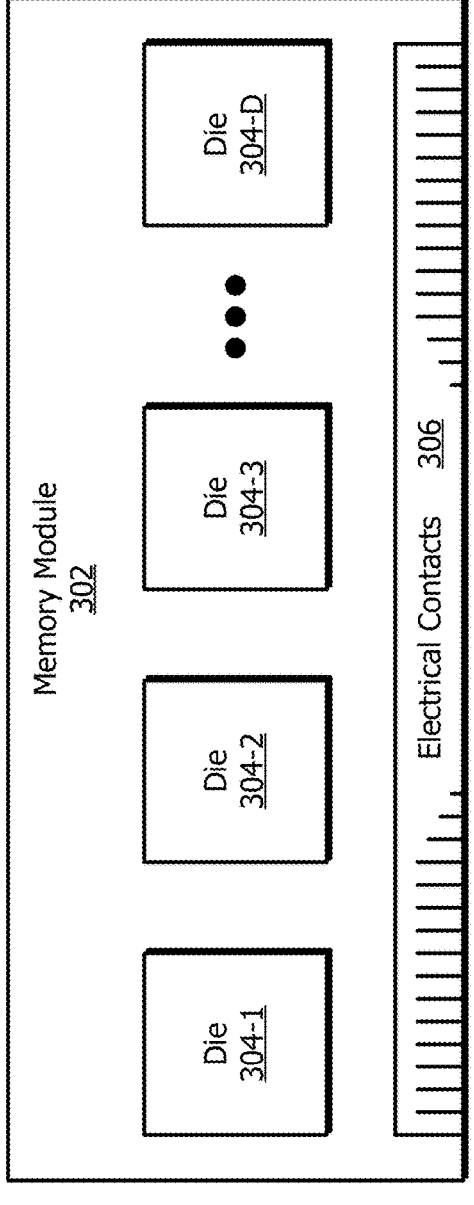
FIG. 3 illustrates an example memory device.

FIG. 3 illustrates an example memory device 300. An example memory module 302 includes multiple dies 304. As illustrated, the memory module 302 includes a first die 304-1, a second die 304-2, a third die 304-3, and a D$^{th}$ die 304-D, with "D" representing a positive integer. As a few examples, the memory module 302 can be a SIMM or a DIMM. The memory device 110 illustrated in FIGS. 1 and 2 can correspond, for example, to a single die 304, multiple dies 304-1 through 304-D, or a memory module 302 with at least one die 304. As shown, the memory module 302 can include one or more electrical contacts 306 (e.g., pins) to interface the memory module 302 to other components.

The memory module 302 can be implemented in various manners. For example, the memory module 302 may include a PCB, and the multiple dies 304-1 through 304-D may be mounted or otherwise attached to the PCB. The dies 304 (e.g., memory dies) may be arranged in a line or along two or more dimensions (e.g., forming a grid or array). The dies 304 may have a similar size or may have different sizes. Each die 304 may be similar to another die 304 or unique in size, shape, data capacity, or control circuitries. The dies 304 may also be positioned on a single side or on multiple sides of the memory module 302.

Figure 4:
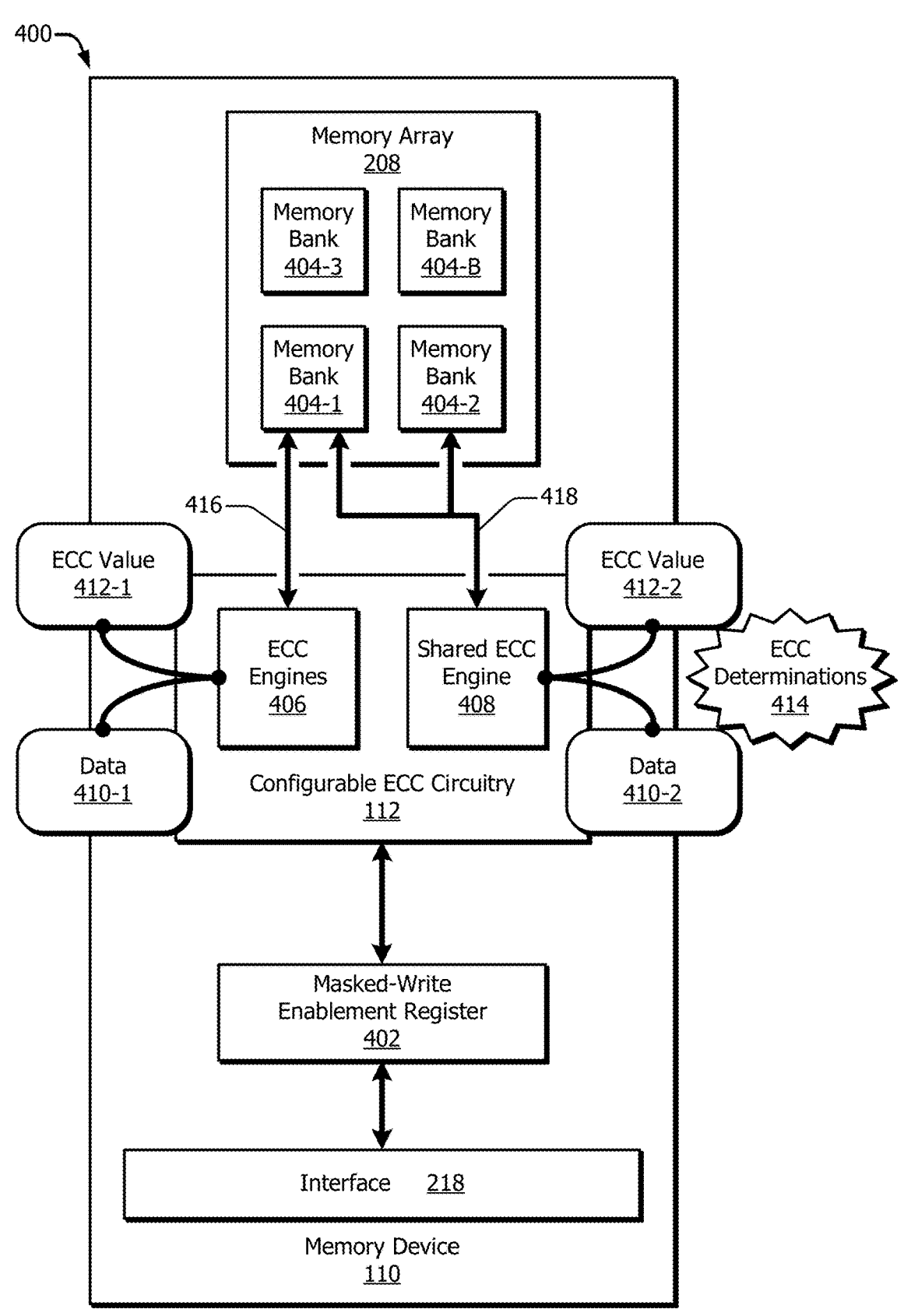
FIG. 4 illustrates an example architecture of a memory device that includes configurable ECC circuitry coupled to a memory array with multiple memory banks.

FIG. 4 illustrates an example architecture 400 of a memory device 110 that includes configurable ECC circuitry 112 coupled to a memory array 208 that includes multiple memory banks 404. The multiple memory banks 404 can include two, three, four, or more memory banks. As shown, the memory array 208 includes a first memory bank 404-1, a second memory bank 404-2, a third memory bank 404-3, and a "B$^{th}$" memory bank 404-B, with "B" representing a positive integer greater than one (e.g., B≥2).

The memory device 110 includes an interface 218 that operatively couples to a masked-write enablement register 402, the memory array 208, and the configurable ECC circuitry 112. The masked-write enablement register 402 can, for example, couple the interface 218 to the configurable ECC circuitry 112. In other examples, the masked-write enablement register 402 and the configurable ECC circuitry 112 can couple in parallel to the interface 218. The configurable ECC circuitry 112 can also couple the interface 218 to the memory array 208 for ECC functions.

The memory device 110 can permit masked-write functionality to be selectively enabled or disabled using the masked-write enablement register 402. As described above, the memory device 110 may implement the masked-write command using an internal read-modify-write operation. In some environments, the memory device 110 may complete a write command within one tCCD (minimum column-to-column command delay time). A masked-write command, in contrast, can consume or occupy four tCCDs because the command comprises an atomic command that may be completed using read, modify, and write commands. This four-unit tCCD duration corresponds to ECC circuitry (e.g., the ECC engines 406) positioned proximate to the memory bank (not explicitly shown in FIG. 4). There is, therefore, a relatively small propagation delay between the read-modify-write circuitry at the memory bank 404 and the respective local ECC engine 406 due to the physical proximity.

If, on the other hand, the ECC circuitry is positioned farther from at least some of the multiple memory banks 404 like this document describes for the shared ECC engine 408, there may be an appreciable propagation delay that can stretch the time duration for performing a masked-write operation to five, six, or more tCCD units. For some systems, such a delay is undesirable, so these systems use the local ECC engines 406 proximate the respective memory banks 404 to save time for performing a masked-write command. The memory device 110 may also provide a selectively engageable masked-write functionality that is responsive to commands received from an external device (e.g., a host device 104 of FIG. 1). When the masked-write functionality is disabled, these systems can use the shared ECC engine 408 to provide ECC techniques that provide improved error detection.

The memory device 110 can include masked-write circuitry (not illustrated in FIG. 4) that can implement a masked-write command using, for example, an internal read-modify-write operation. The masked-write circuitry can be selectively enabled and disabled in described implementations to realize an enabled mode and a disabled mode, respectively. The control circuitry 210 of FIG. 2 may include at least one masked-write enablement register 402. The masked-write enablement register 402 may be part of the registers 212 of FIG. 2. One value (e.g., a "0" or a "1") of the masked-write enablement register 402 enables the masked-write functionality provided by the masked-write circuitry. Another value (e.g., a "1" or a "0") of the masked-write enablement register 402 disables the masked-write functionality. Disabling of the masked-write functionality precludes use of a masked-write command in the memory device 110. In some implementations, the masked-write enablement register 402 is set to the enabling value by default.

In example operations, a host device 104 can transmit a command (e.g., a masked-write enable command) to enable masked-write functionality provided by the masked-write circuitry. For instance, the enable command sets the masked-write enablement register 402 to enable the masked-write functionality by activating the masked-write circuitry. While the masked-write enablement register 402 is, for instance, set, the memory device 110 performs masked-write operations responsive to receipt of a masked-write command over an interconnect 106. The memory device 110 can also perform ECC functionality associated with a write command or a read command using an ECC engine 406 positioned near a respective memory bank 404. The host device 104 can also transmit another command (e.g., a masked-write disable command) for disabling the masked-write functionality provided by the masked-write circuitry. Based on the other command (e.g., the masked-write disable command), the control circuitry 210 can clear the masked-write enablement register 402 to disable the masked-write functionality by deactivating the masked-write circuitry. While the masked-write enablement register 402 is, for instance, cleared, the masked-write command is precluded, and the memory device 110 does not perform masked-write operations. The memory device 110 can also perform ECC functionality associated with another write command or read command using the shared ECC engine 408. In some cases, the masked-write enablement register 402 can contain more than one bit to establish various modes or masked-write functionality separately for different memory banks or groups thereof.

As described, the configurable ECC circuitry 112 may include multiple ECC engines 406 and at least one shared ECC engine 408. Each ECC engine 406 generally corresponds to and is positioned near a respective memory bank 404 of the multiple memory banks 404. The ECC engines 406 can provide respective ECC determinations for the respective memory banks 404. The shared ECC engine 408 can correspond to at least two of (or all) the memory banks 404 of the multiple memory banks 404. In some implementations, the memory device 110 can include multiple shared ECC engines 408 that correspond to a subset of the memory banks 404 of the multiple memory banks 404. The shared ECC engine 408 can provide ECC determinations for the multiple memory banks 404. The configurable ECC circuitry 112 uses ECC values 412 of varying bit sizes (e.g., 8-bit, 10-bit, 12-bit, 14-bit, or 16-bit) depending on operating settings of the memory device.

The configurable ECC circuitry 112 can provide ECC functionality to the multiple memory banks 404-1 through 404-B. For example, one of the ECC engines 406, which is a circuit or circuitry, or a portion of a circuit or circuitry, configured in the periphery of a memory device or in CMOS under a memory array or in a logic die associated with a stack of memory dies, can provide ECC functionality to one memory bank 404 (e.g., the first memory bank 404-1). Another of the ECC engines 406 can provide ECC functionality to another memory bank 404 (e.g., the second memory bank 404-2). The shared ECC engine 408 can provide ECC functionality to two or more memory banks 404 (e.g., the first memory bank 404-1 and the second memory bank 404-2). The shared ECC engine 408 can also provide ECC functionality to all of the multiple memory banks 404-1 through 404-B on a single die 304 (as illustrated in FIG. 3), where the quantity "B" represents all memory banks within the memory array 208 or disposed on the single die 304. Alternatively, a given shared ECC engine 408 may provide ECC functionality to all of the memory banks 404 within a given memory bank group; in such cases, a memory die may include a shared ECC engine 408 per memory bank group.

The ECC functionality can include performing ECC determinations 414. To perform an ECC determination 414, an ECC engine 406 of the multiple ECC engines 406 determines a first ECC value 412-1 based on first data 410-1. To perform another ECC determination 414, the shared ECC engine 408 determines a second ECC value 412-2 based on second data 410-2. The ECC engines 406 and the shared ECC engine 408 can use any ECC algorithm or combination of multiple ECC algorithms to compute the ECC values 412. Examples of ECC algorithms include those relating to block codes, such as Hamming codes, Reed-Solomon codes, Golay codes, Bose-Chaudhuri-Hocquenghem (BCH) codes, multidimensional codes, or other ECC coding schemes. However, the ECC engines 406 and the shared ECC engine 408 can employ one or more alternative ECC algorithms for block codes or employ an alternative coding scheme.

The ECC engines 406 or the shared ECC engine 408 can employ ECC algorithms of varying strengths or capabilities. These strengths or capabilities may at least partially be indicated by, or correspond to, a bit-size of the ECC values 412. For example, the first ECC value 412-1 can be 8-bit. The second ECC value 412-2 can be ten-bit (10-bit), 12-bit, 14-bit, or 16-bit. By way of example, eight-bit ECC values may enable correction of single-bit errors and detection of double-bit errors with respect to 128-bit data. Such functionality is sometimes referred to as single-error correction and double-error detection, or SECDED. In contrast, 16-bit ECC values may enable correction of single-bit errors and enable detection of higher-bit-order errors (e.g., three-bit, four-bit errors) with respect to 256-bit data. Also, the longer bit lengths of the second ECC value 412-2 can provide more-reliable error detection (e.g., above 90%) of two-bit errors. Generally, longer ECC values 412 can entail circuitry that occupies more area, performs ECC processes more slowly, or consumes more power.

In example operations, the ECC engine 406 accepts first data 410-1 and produces the first ECC value 412-1 based on the first data 410-1 using an ECC algorithm. As shown in FIG. 4 at 416, the first data 410-1 corresponds to the first memory bank 404-1. The data 410 can correspond to a given memory bank 404 if at least a portion of the data 410 is stored in the memory bank 404 (e.g., being processed as part of a read operation) or is destined for storage in the memory bank 404 (e.g., being processed as part of a write operation). In this ECC determination 414, the ECC engine 406 determines the first ECC value 412-1 based on the first data 410-1.

The first ECC value 412-1 can be stored in association with the corresponding first data 410-1 from which the ECC value is generated. For example, the ECC value 412 can be stored in, or at least at or in association with, the same memory bank 404 as the associated data 410. In this case, the first ECC value 412-1 can be stored in the first memory bank 404-1 with the associated first data 410-1 (e.g., in the same row). Additionally or alternatively, the ECC value 412 can be stored in, or at least at, the ECC engine 406, a table, or other memory (not illustrated in FIG. 4) that holds ECC values 412 for one or more memory banks 404. The configurable ECC circuitry 112 can include or have access to, for instance, an ECC-dedicated memory or a memory that stores memory protection information generally (e.g., ECC values, hash codes, or encryption data). For this latter case, the memory device 110 can store the first ECC value 412-1 in memory at the ECC engine 406 in association with the first data 410-1, such as in a location corresponding to the address at which the first data 410-1 is stored at the first memory bank 404-1.

In other example operations, the shared ECC engine 408 accepts the second data 410-2 and produces the second ECC value 412-2 based on the second data 410-2 using an ECC algorithm. As shown in FIG. 4 at 418, the second data 410-2 corresponds to the first memory bank 404-1 and the second memory bank 404-2. In this ECC determination 414, the shared ECC engine 408 determines the second ECC value 412-2 based on the second data 410-2. The second ECC value 412-2 can be stored in association with the corresponding second data 410-2. In this case, at least a portion of the second ECC value 412-2 can be stored in (or at or in association with) the first memory bank 404-1 and the second memory bank 404-2 with the associated second data 410-2. As described above for the ECC value 412-1, the ECC value 412-2 may alternatively be stored in a centralized or joint location, such as a memory array proximate to the shared ECC engine 408.

At least a portion of the configurable ECC circuitry 112 (e.g., including the ECC engines 406 and the shared ECC engine 408) can comprise or realize ECC logic. In some implementations, the shared ECC engine 408 of the configurable ECC circuitry 112 can provide ECC determinations 414 for two or more of the multiple memory banks 404-1 through 404-B. The configurable ECC circuitry 112 can provide other ECC functionality, like interacting with the interface 218 or an internal bus (not illustrated in FIG. 4) to receive or transmit data 410 or ECC values 412 to an external interconnect (e.g., the interconnect 106 of FIGS. 1 and 2) or to the memory array 208. ECC functionality can further include determining if at least one error has occurred, correcting an error, signaling to other control circuitry that an error has occurred, and so forth using comparisons between a determined ECC value and a stored or received ECC value. Examples of additional ECC functionality are described further below with reference to FIGS. 5 through 8.

FIG. 5 illustrates an example architecture 500 for a memory device that includes configurable ECC circuitry 112 and multiple memory banks 404 on a die 304. As shown, the memory array 208 includes 32 memory banks 404-1L through 404-16L and 404-1R through 404-16R. The memory banks 404 are grouped into two bank groups (e.g., a left bank group and a right bank group), each arranged in a 4×4 grid. A first row of the left bank group includes memory banks 404-1L to 404-4L, a second row includes memory banks 404-5L to 404-8L, a third row includes memory banks 404-9L to 404-12L, and a fourth row includes memory banks 404-13L to 404-16L. A first row of the right bank group includes memory banks 404-1R to 404-4R, a second row includes memory banks 404-5R to 404-8R, a third row includes memory banks 404-9R to 404-12R, and a fourth row includes memory banks 404-13R to 404-16R. Other implementations, however, may include a different quantity of memory banks or a different organization or layout of memory banks.

The die 304 also includes multiple interfaces that may form part of the interface 218 (e.g., of FIGS. 2 and 4). The multiple interfaces can include a first data bus interface 502-1 for a lower byte of data-including or corresponding to the DQ pins [0:7]—and a second data bus interface 502-2 for an upper byte of data-including or corresponding to the DQ pins [8:15]. The first and second data bus interfaces 502-1 and 502-2 can interface with the data (DQ) bus 122 (of FIG. 1). The multiple interfaces of the die 304 can also include a command and address (CA) bus interface 504 to interface with the command and address (CA) bus 120 (of FIG. 1).

In some implementations, the architecture 500 can represent a memory device 110 (e.g., the memory device 110 of FIGS. 1, 2, and 4) that can selectively enable and disable masked-write functionality. The masked-write functionality can correspond to an internal read-modify-write operation as described above. Disabling the masked-write functionality can selectively eliminate a memory access operation with a relatively high tCCD count (where "tCCD" represents a minimum column-to-column command delay time). Disabling masked-write commands can also avoid incurring a performance penalty if the memory device performs a read-modify-write internal operation while using physically remote ECC circuitry (e.g., the shared ECC engine 408). This document describes the circuitry to selectively enable or disable a masked-write functionality in greater detail with reference to FIG. 4.

The DRAM architecture can also incorporate configurable ECC circuitry and schemes for greater reliability and better die-area utilization based on a shared ECC circuitry or logic (e.g., the shared ECC engine 408). The architecture 500 is illustrated as a single die 304 that can realize an LPDDR SDRAM with 32 memory banks 404-1L through 404-16L and 404-1R through 404-16R. In other implementations, the memory array 208 can be another type of memory or another configuration of a banked LPDDR. Other configurations may include, for example, a different number of banks (e.g., one bank, four banks, or eight banks) or a different configuration of banks (e.g., a grouped bank configuration, including four groups of four memory banks each). In some implementations, the architecture 500 can also be user-selectable and include either eight banks, four banks with four bank groups, or sixteen banks.

The architecture 500 also includes local ECC circuitry as indicated by the ECC engines 406-1L through 406-16L and the ECC engines 406-1R through 406-16R. The local ECC engines 406 can correspond to a respective memory bank 404 of the memory array 208. For example, the ECC engine 406-1L can correspond to the memory bank 404-1L. Similarly, the ECC engine 406-1R can correspond to the memory bank 404-1R. In other implementations, the local ECC engines 406 can correspond to two or more memory banks 404. For example, the ECC engine 406-1L could correspond to the memory banks 404-1L and 404-2L.

The ECC engines 406-1L through 406-16L, the ECC engines 406-1R through 406-16R, and the shared ECC engine 408 may be included as part of the configurable ECC circuitry 112. The ECC engines 406-1L through 406-16L and 406-1R through 406-16R can be realized, for instance, with hardware that uses 8-bit ECC values 412. In contrast, the shared ECC engine 408 can be realized, for instance, with hardware that uses larger bit-sized ECC values 412 (e.g., 10-bit, 12-bit, 14-bit, 16-bit, 32-bit). The shared ECC engine 408 is shared among multiple memory banks 404 of the memory array 208. For example, the shared ECC engine 408 is shared between some (e.g., two or more), including up to all, of the 32 memory banks 404 via one or more data paths (not illustrated in FIG. 5). The data paths may include one or more wires or sets of wires common between two or more memory banks 404, separate between the memory banks 404, or partially common and partially separate between the memory banks 404. For example, the data paths may include wires or sets of wires used to provide byte-mode functionality on the die 304. Examples of such data path implementations are described below with reference to FIG. 6.

The byte-mode functionality can be selectively enabled and disabled using at least one byte-mode enablement register (not illustrated in FIG. 5). The byte-mode enablement register may be part of the one or more registers 212 (of FIG. 2). For example, one value (e.g., a "1" or a "0") of the byte-mode enablement register can enable the byte-mode functionality and cause a word-wide memory device (e.g., the memory device 110) to operate in the byte mode and to present the high or low byte on a predefined data pin set. Another value (e.g., a "0" or a "1") of the byte-mode enablement register disables the byte-mode functionality. Generally, activation of a byte mode enables a memory device to provide, process, or otherwise manipulate a set of bits that are fewer in quantity than a full standard bit width at which data is normally accessed or received by the memory device.

As described above, the die 304 (or memory device 110) can also include a command and address (CA) bus interface 504 and a data bus (DQ) interface 502 (illustrated as 502-1 and 502-2). In some implementations, the die 304 (or memory device 110) may also include a chip-select (CS) interface (not illustrated in FIG. 5). For example, the CA bus interface 504 can correspond to or be coupled to the command address bus 120 (e.g., representing CA pins on a DDR memory device). The DQ interface 502 can correspond to or be coupled to the DQ bus 122 (e.g., representing DQ pins on a DDR memory device).

Figure 6:
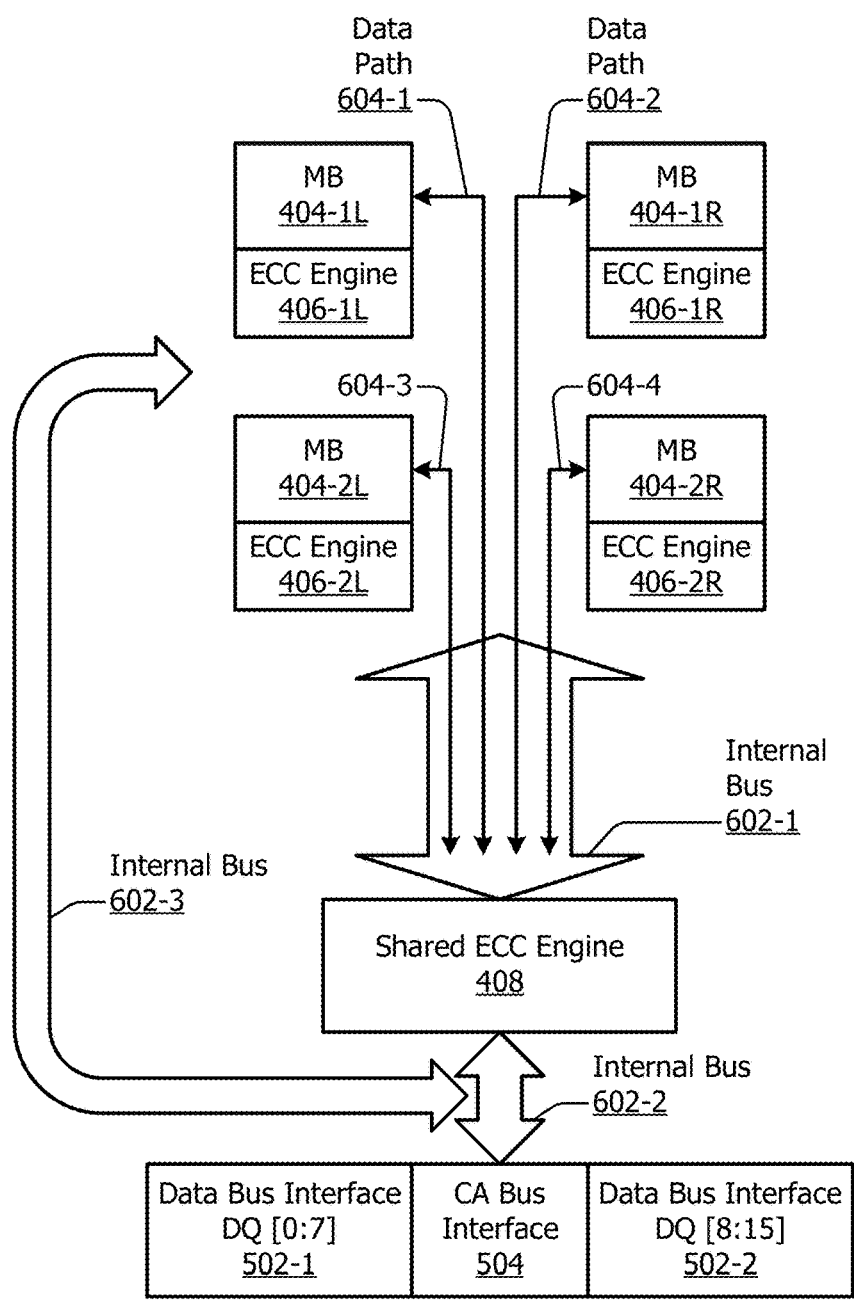
FIG. 6 illustrates an example architecture for a memory device that includes configurable ECC circuitry, multiple memory banks, and one or more internal data buses.

FIG. 6 illustrates an example architecture 600 of internal data buses 602-1, 602-2, and 602-3 for memory devices that include configurable ECC circuitry and multiple memory banks 404. The example of architecture 600 is depicted with four memory banks 404-1L, 404-1R, 404-2L, and 404-2R4. The principles and techniques of the architecture 600 are applicable to smaller or larger quantities of memory banks. The configurable ECC circuitry includes the local ECC engines 406-1L, 406-1R, 406-2L, and 406-2R positioned proximate to their respective memory banks 404. The configurable ECC circuitry also includes the shared ECC engine 408.

As illustrated, the architecture 600 can include multiple internal data buses 602 for a memory device 110 (e.g., of FIGS. 1, 2, and 4). The first and second internal data buses 602-1 and 602-2 respectively couple the shared ECC engine 408 to the multiple memory banks 404 and to the data bus interfaces 502-1 and 502-2 and the CA bus interface 504. As described in greater detail with respect to FIG. 4, the data-masking functionality can be selectively enabled or disabled by the host device 104.

As shown in FIG. 6, a memory architecture that employs configurable ECC circuitry can also include a third internal data bus 602-3. The third internal data bus 602-3 can couple the multiple ECC engines 406 to the data bus interfaces 502-1 and 502-2 and the CA bus interface 504 without traversing the shared ECC engine 408. The multiple ECC engines 406 are coupled to the respective memory banks 404 via internal buses or data paths (not illustrated in FIG. 6). The third internal data bus 602-3 therefore enables data or control signal propagation to bypass the shared ECC engine 408.

In example implementations, the first internal data bus 602-1 is coupled between the shared ECC engine 408 and the multiple memory banks 404, and the second internal data bus 602-2 is coupled between the shared ECC engine 408 and the data bus interfaces 502 and the CA bus interface 504. Each internal data bus 602 may include multiple wires for propagating data or control signaling, in conjunction with any buffers, latches, switches, multiplexers, etc., that are used for propagation or routing control. The first internal data bus 602-1 includes multiple data paths 604-*a* first data path 604-1, a second data path 604-2, a third data path 604-3, a fourth data path 604-4, and so forth. Each data path 604 of two or more data paths may include a set of wires to propagate signals, so the multiple data paths 604-1 to 604-4 may together include multiple sets of wires. The data paths 604 can also support byte-mode functionality. In this way, the coupling of the shared ECC engine 408 to the memory banks 404 does not require additional wires or more die area. As a result, the memory device can provide configurable ECC circuitry and schemes that provides improved error-detection coverage with a minimal die-area penalty required to provide the shared ECC engine 408.

The data paths 604 may have a quantity equal to the quantity of the multiple memory banks 404-1 through 404-B (of FIG. 4), which is illustrated as four memory banks 404 in FIG. 6. Thus, a respective data path 604-1, 604-2, 604-3, or 604-4 of multiple data paths 604-1 to 604-4 couples a respective memory bank 404-1L, 404-1R, 404-2L, or 404-2R to the shared ECC engine 408. Each respective data path 604 can include a shared or respective set of wires that can propagate data or an ECC value between the shared ECC engine 408 and a respective memory bank 404.

In the example architecture 600, at least one data path 604 has a common or shared portion with another data path 604 of the first internal data bus 602-1. For example, a portion of the first internal data bus 602-1 that is proximate to, or interfaces with, the shared ECC engine 408 can provide a shared pathway for each data path 604 of the multiple data paths 604-1 to 604-4. In another implementation (not illustrated in FIG. 6), each data path 604 of the multiple data paths 604-1 to 604-4 can be separate from each other data path 604 of the first internal data bus 602-1. For example, each respective data path 604 can have a separate respective interface with the shared ECC engine 408. In such an implementation, the first data path 604-1 may provide a separate propagation route between the first memory bank 404-1L and the shared ECC engine 408. Similarly, the second data path 604-2 may provide a separate propagation route between the second memory bank 404-1R and the shared ECC engine 408. The third data path 604-3 may provide a separate propagation route between the shared ECC engine 408 and the third memory bank 404-2L. And the fourth data path 604-4 may provide a separate propagation route between the shared ECC engine 408 and the fourth memory bank 404-2R.

The third internal data bus 602-3 can include multiple data paths 604 (not illustrated in FIG. 6). Each data path 604 of the multiple data paths 604 may include a set of wires to propagate signals, so the multiple data paths 604 may together include multiple sets of wires. Each respective data path 604 can include a shared or respective set of wires that can propagate data or an ECC value between the data bus interfaces 502-1 and 502-2 and the CA bus interface 504.

Figures 1, 7:
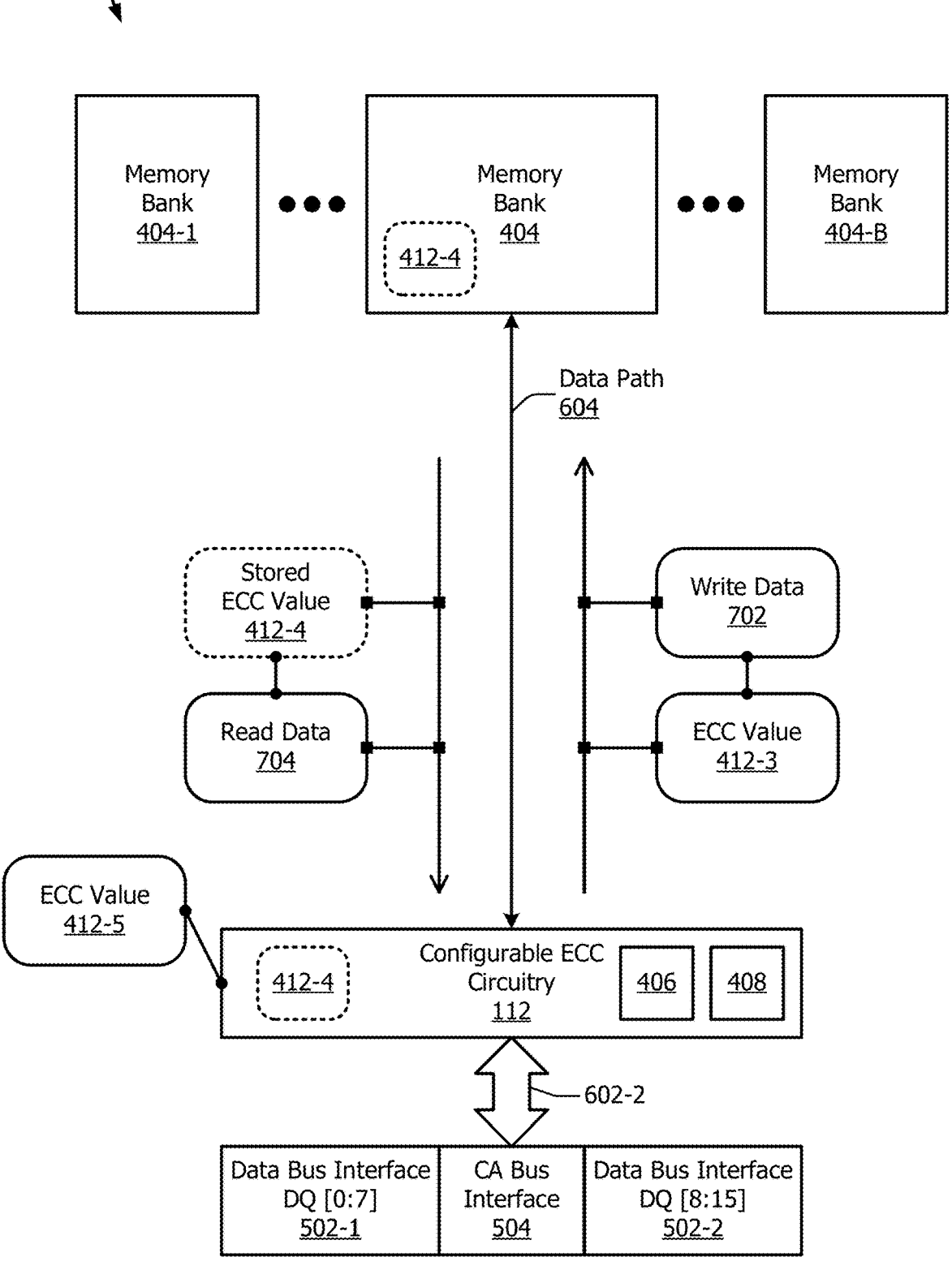
Figure 7:
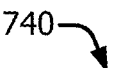
Figure 4:
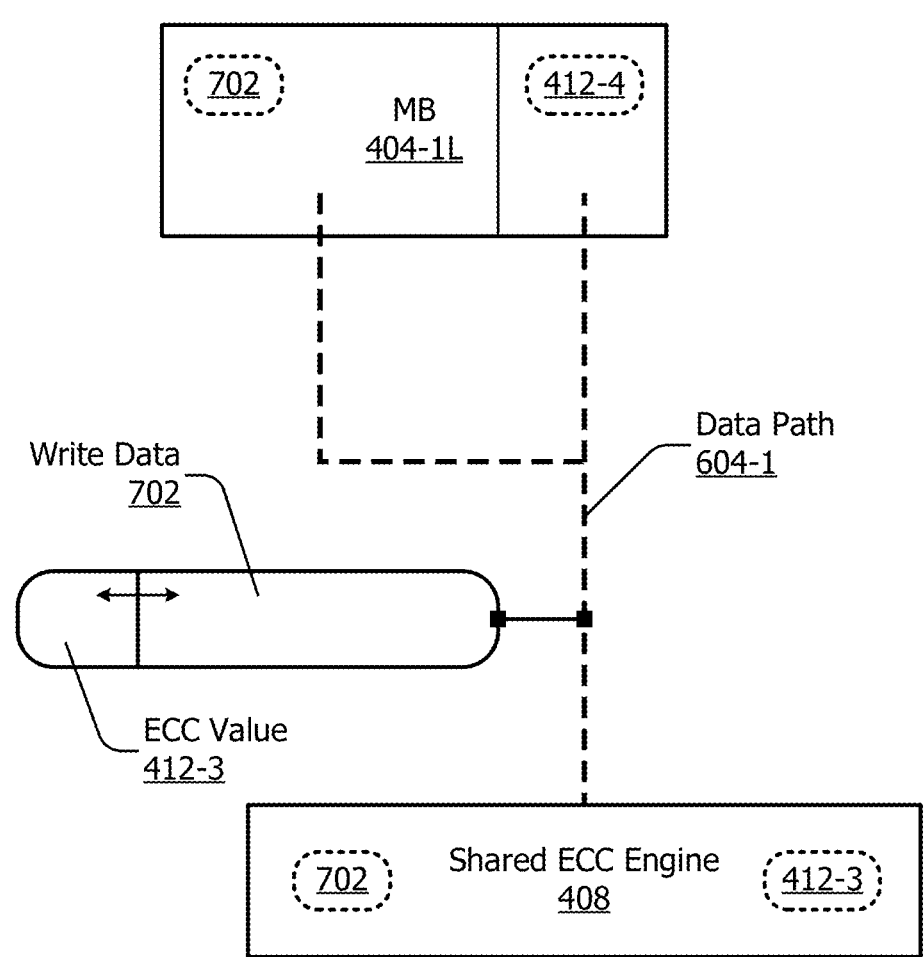

FIG. 7-1 through 7-4 illustrate example operations of configurable ECC circuitry 112 and schemes for read operations and write operations in accordance with example protocols 700, 720, 730, and 740. FIGS. 7-1 through 7-4 also illustrate example locations for storing ECC values 412. The example operations are described in terms of the memory bank 404 and a corresponding data path 604.

In an example write operation, the configurable ECC circuitry 112 receives write data 702 from the data bus interface 502. The local ECC engine 406 or the shared ECC engine 408 of the configurable ECC circuitry 112 determines an ECC value 412-3 based on the write data 702 and/or confirms that a received ECC value matches a determined ECC value for the write data. The write data 702 is stored in the memory bank 404 based on the memory address associated with the write data 702. The configurable ECC circuitry 112 can transmit or forward the write data 702 to the memory bank 404 via the data path 604. Alternatively, the array control logic 214 (of FIG. 2) can transmit the write data 702 to the memory bank 404 via the data path 604 or another bus, such as the third internal data bus 602-3 of FIG. 6. Various implementations of the example write operation are described in greater detail in FIGS. 7-2 through 7-4, with protocols 720, 730, and 740, respectively.

In FIG. 7-2 with the protocol 720, consider that the data-masking functionality is enabled by a host device 104. The write data 702 is associated with the memory bank 404-1L. In the example write operation, the ECC engine 406-1L receives the write data 702 from the data bus interface 502. As illustrated in FIG. 7-1, the ECC engine 406-1L determines the ECC value 412-3 based on the write data 702. When the data-masking functionality is enabled, the write data 702 can include a first quantity of bits (e.g., 128 bits) and the ECC value 412-3 can include a second quantity of bits (e.g., 8 bits). The write data 702 is stored in the memory bank 404-1L based on the memory address associated with the write data 702. The ECC engine 406-1L can transmit or forward the write data 702 to the memory bank 404-1L via the data path 604. Alternatively, the array control logic 214 (of FIG. 2) can transmit the write data 702 to the memory bank 404-1L via the data path 604 or another bus, such as the third internal data bus 602-3 of FIG. 6. The ECC engine 406-1L or the array control logic 214 can write the ECC value 412-3 in, at, or otherwise in association with the memory bank 404-1L via the data path 604 to produce the stored ECC value 412-4.

In FIG. 7-3 with the protocol 730, consider that the data-masking functionality is disabled by the host device 104 in a first implementation with the shared ECC engine 408. The write data 702 is associated with the memory banks 404-1L and 404-1R. In the example write operation, the shared ECC engine 408 receives the write data 702 from the data bus interface 502. As illustrated in FIG. 7-3, the shared ECC engine 408 determines the ECC value 412-3 based on the write data 702. When the data-masking functionality is disabled, the write data 702 can include a third quantity of bits (e.g., 256 bits) and the ECC value 412-3 can include a fourth quantity of bits (e.g., 16 bits). The write data 702 can be split into a first portion 702-L (e.g., write data 702-L) and a second portion 702-R (e.g., write data 702-R) stored in the memory banks 404-1L and 404-1R, respectively, based on the memory address associated with the write data 702. The shared ECC engine 408 can transmit or forward the write data 702-L and 702-R to the memory banks 404-1L and 404-1R via the data paths 604-1 and 604-2, respectively. Alternatively, the array control logic 214 (of FIG. 2) can transmit the write data 702-L and 702-R to the memory banks 404-1L and 404-1R via the data paths 604-1 and 604-2, respectively, or via another bus, such as the third internal data bus 602-3 of FIG. 6. The shared ECC engine 408 can split the ECC value 412-3 into two portions: an ECC value 412-4L and an ECC value 412-4R. The shared ECC engine 408 or the array control logic 214 can write the ECC value 412-4L and the ECC value 412-4R in, at, or otherwise in association with the memory banks 404-1L and 404-1R via the data paths 604-1 and 604-2, respectively.

In a subsequent read operation, the shared ECC engine 408 can retrieve or otherwise receive the write data 702-L and 702-R and concatenate the portions together as the write data 702 to produce read data for the read operation. In the subsequent read operation, the shared ECC engine 408 can retrieve or otherwise receive the ECC value 412-4L and the ECC value 412-4R. The shared ECC engine 408 can also concatenate the portions together as the stored ECC value 412-4 to produce an ECC value for verifying data reliability for the read operation.

In FIG. 7-4 with the protocol 740, consider that the data-masking functionality is disabled by the host device 104 in a second implementation with the shared ECC engine 408. In this second implementation, a byte mode is enabled at the memory device 110. The write data 702 is associated with the memory bank 404-1L. In the example write operation, the shared ECC engine 408 receives the write data 702 from the data bus interface 502. As illustrated in FIG. 7-4, the shared ECC engine 408 determines the ECC value 412-3 based on the write data 702. When the data-masking functionality is disabled, the write data 702 can include a fifth quantity of bits (e.g., 126, 124, 122, or 120 bits) and the ECC value 412-3 can include a sixth quantity of bits (e.g., 10, 12, 14, or 16 bits, respectively). A portion of the communicated data or data package that includes the write data 702 can be dedicated to provide an ECC value with a larger quantity of bits. For example, two, four, six, or eight bits of the communicated data can form part of the ECC value 412-3.

The registers 212 (of FIG. 2) may include at least one mode register (MR) that indicates a quantity of bits from the communicated data that are not data bits but are instead allocated as ECC bits or dummy bits (e.g., zeroes or high values) and to select the sixth quantity of bits. For example, one value (e.g., a "00") of the mode register can indicate that two bits of the communicated data are ECC bit values or dummy bit values (e.g., the write data 702 includes 126 bits), and the ECC value 412-3 is 10-bit. As additional examples, other values (e.g., "01," "10," or "11") of the mode register can indicate that four, six, or eight bits of the communicated data are ECC bit values or dummy bit values (e.g., the write data 702 includes 124, 122, or 120 bits), and the ECC value 412-3 is 12-bit, 14-bit, or 16-bit, respectively. The write data 702 can be stored in the memory bank 404-1L based on the memory address associated with the write data 702. The shared ECC engine 408 can transmit or forward the write data 702 to the memory bank 404-1L via the data path 604-1. Alternatively, the array control logic 214 (of FIG. 2) can transmit the write data 702 to the memory bank 404-1L via the data paths 604-1 or another bus, such as the third internal data bus 602-3 of FIG. 6.

As discussed above, the configurable ECC circuitry 112 can store the ECC value 412-3—e.g., write the ECC value 412-3 to one or more memories on the die as a stored ECC value 412-4. The ECC value 412-3 can be stored in association with the write data 702. The ECC value 412-3 can be stored in the memory bank 404 in association with the write data 702, stored "centrally" with other ECC values associated with data stored in other memory banks, and so forth. For instance, the ECC value 412-3 can be stored in a row with the write data 702 or otherwise in relation to the write data 702 at the memory bank 404. Alternatively, the ECC value 412-3 can be stored at least proximate to the local ECC engines 406 (e.g., near or as part of the local ECC engine

406) and in association with the respective write data 702 (e.g., based on the memory address thereof). The control circuitry 210 (of FIG. 2) can alternatively store the ECC value 412-3 in memory—the memory bank 404 or a memory associated with the configurable ECC circuitry 112. Regardless, an ECC value 412 (e.g., the ECC value 412-3) stored in memory can be referred to as a stored ECC value 412-4. In FIG. 7-1, example instances of a stored ECC value 412-4 are depicted as being associated with read data 704 during propagation on an internal bus and stored at the memory bank 404. A stored ECC value 412-4 may, however, be stored elsewhere or propagated differently than is shown.

In an example read operation as illustrated in FIG. 7-1, the configurable ECC circuitry 112 (e.g., an ECC engine 406 or the shared ECC engine 408) receives read data 704 stored in the memory bank 404. The ECC engine 406 or the shared ECC engine 408, depending on whether masked-write functionality is enabled or disabled, can retrieve the read data 704 "directly," or the array control logic 214 can provide the read data 704 to the ECC engine 406 or the shared ECC engine 408. The ECC engine 406 or the shared ECC engine 408 also obtains (e.g., retrieves, extracts, or reads) the stored ECC value 412-4 from the memory bank 404, from a "local" or ECC-specific memory for the ECC engine 406 or the shared ECC engine 408, or from another memory. In some cases, the stored ECC value 412-4 can be retrieved automatically as part of retrieving the read data 704 for a read memory access operation. Alternatively, the ECC engine 406, the shared ECC engine 408, or the control circuitry 210 can obtain the stored ECC value 412-4 in a separate operation.

The ECC engine 406 or the shared ECC engine 408 of the configurable ECC circuitry 112 determines an ECC value 412-5 based on the read data 704. The quantity of bits for the determined ECC value 412-5 is the same as the quantity of bits for the stored ECC value 412-4. For example, if the ECC engine 406 (e.g., the ECC engine 406-1L) processes the read data 704, the stored ECC value 412-4 can be 8-bit, and the determined ECC value 412-5 can be also 8-bit. If the shared ECC engine 408 processes the read data 704, the stored ECC value 412-4 can be 10-bit, 12-bit, 14-bit, or 16-bit (e.g., as discussed with respect to FIGS. 7-3 and 7-4) and the determined ECC value 412-5 can likewise be 10-bit, 12-bit, 14-bit, or 16-bit, respectively.

If the determined ECC value 412-5 matches the stored ECC value 412-4, the read data 704 can be coupled to the data bus interface 502 without further processing—e.g., the configurable ECC circuitry 112 (e.g., the ECC engine 406 or the shared ECC engine 408) can authorize the forwarding of the read data 704 to the data bus interface 502 that is coupled to the interconnect 106. At times, however, the determined ECC value 412-5 will not match the stored ECC value 412-4 if one or more bits have been corrupted. If the determined and stored ECC values do not match, then the configurable ECC circuitry 112 has detected an error and can perform at least one other action to implement an ECC-based technique. For example, the configurable ECC circuitry 112 can correct the error if the level of ECC provided can overcome the number of bit errors, forward corrected read data to the data bus interface 502, signal that an error has been detected, signal that an error has been detected and corrected, or a combination thereof.

Figure 8:
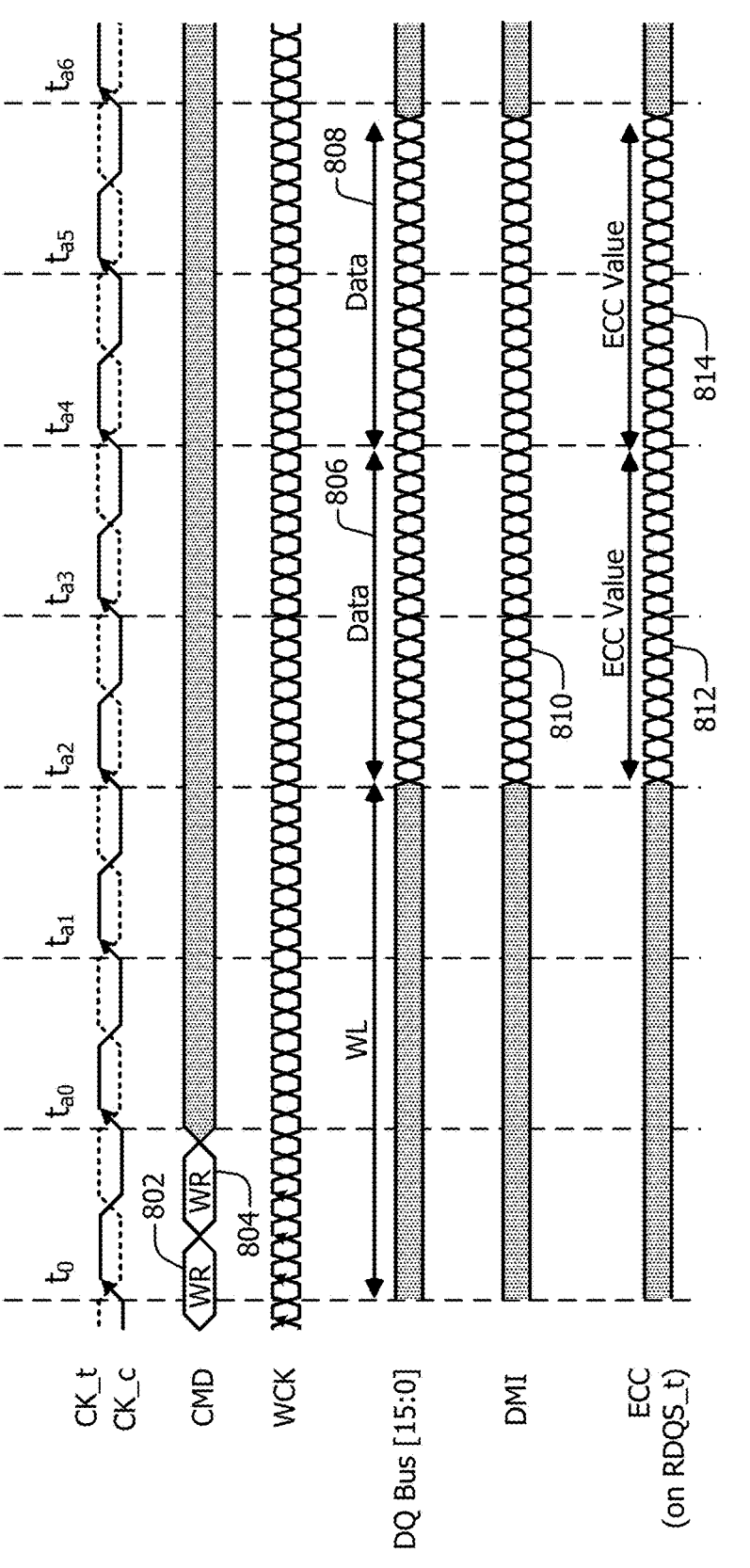
FIGS. 8 and 9 illustrate example timing diagrams depicting aspects of configurable error correction.
Figure 9:
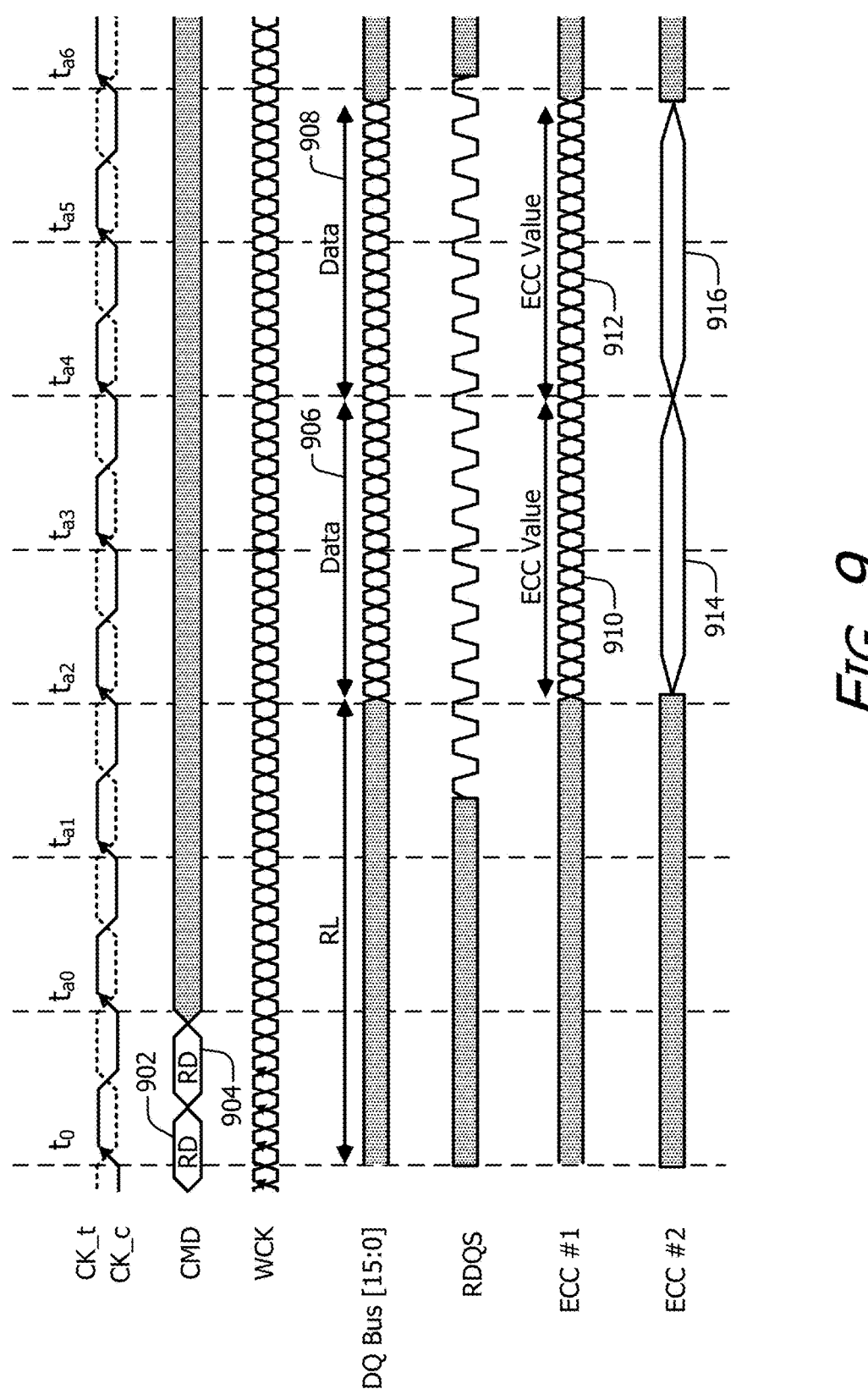

FIGS. 8 and 9 illustrate example timing diagrams 800 and 900 for configurable error correction. The timing diagram 800 in FIG. 8 illustrates configurable ECC functionality in a memory device in conjunction with a write operation. The timing diagram 900 in FIG. 9 illustrates configurable ECC functionality in a memory device in conjunction with a read operation. The descriptions related to FIGS. 8 and 9 reference the hardware and techniques described above for FIGS. 1 through 7-4. Nonetheless, the timing diagrams 800 and 900 may be implemented with different hardware, techniques, schemes, or a combination thereof. Generally, the timing diagrams 800 and 900 indicate example signaling between a host device 104 and a memory device 110. The depictions and descriptions provide example device pins and data lines of an interconnect; however, the signals may be propagated using different pins or data lines. In some environments, the timing diagrams 800 and 900 relate to a memory mode in which masked-write functionality is disabled (or nonexistent/omitted). Further, link ECC functionality over the interconnect 106 between the host device 104 and the memory device 110 may also be disabled.

At 802, a first write command (WR) is received in conjunction with data 806 at the DQ interface 502 of the memory device 110. At 804, a second write command (WR) is received in conjunction with data 808 at the DQ interface 502 of the memory device 110. The memory device 110 can receive the write commands via the CA bus interface 504. Accordingly, a host device 104 can transmit the write commands 802 and 804 and the data 806 and 808 over the CA bus 120 and the DQ bus 122, respectively. In the depicted implementations, the data 806 and 808 have a bit size of 256 bits distributed over 16 DQ pins across a 16-beat data burst length.

To enter a mode in which 256:16 ECC functionality is employed at the memory device 110, the host device 104 disables masked-write functionality. To do so, the host device 104 transmits a command to the memory device 110 via the CA bus 120. For example, the host device 110 can transmit, and the memory device 110 may receive, a memory register write command targeting the masked-write enablement register 402 or a multi-purpose command (MPC) disabling performance of masked-write commands at the memory device 110. Such commands (not shown in FIG. 8) to disable masked-write functionality can set the masked-write enablement register 402 (e.g., by using the value "0"). The memory device 110 also receives an ECC value 812 associated with the data 806 and an ECC value 814 associated with the data 808 from the host device 104. The host device 104 can transmit the ECC values 812 and 814 on, for example, the read strobe line (RDQS_t) of the interconnect 106. In the depicted examples, the ECC values 812 and 814 have a 16-bit size. In other implementations, the ECC values 812 and 814 can have different sizes, including 10-bit, 12-bit, or 14-bit as described with respect to FIG. 7-4.

The shared ECC engine 408 can then use the data 806 and the ECC value 812 to perform ECC determinations. In particular, the shared ECC engine 408 can compute a determined ECC value (e.g., the ECC value 412-3) with the same bit size as the ECC value 812. The shared ECC engine 408 can then compare the determined ECC value to the ECC value 812. If the determined ECC value and the ECC value 812 match (e.g., are the same), the shared ECC engine 408 can cause the data 806 and the determined ECC value (or the ECC value 812) to be stored in the memory banks 404. On the other hand, if the determined ECC value and the ECC value 812 fail to match (e.g., are not the same), the shared ECC engine 408 can correct, for instance, a single-bit error and then cause the corrected data and the ECC value 812 to be saved in the memory banks 404. The shared ECC engine 408 can perform a similar set of operations with the data 808 and the corresponding ECC value 814.

In certain implementations, if the masked-write functionality is disabled at the memory device 110, the memory device 110 treats the input 810 on a Data Mask/Inversion (DMI) bus interface as a data bus inversion (DBI) signal. The DBI signal can indicate whether the memory device 110 needs to invert the write data (e.g., the data 806) received on the DQ bus 122 within a byte. For example, the memory device 110 can invert the data 806 or the data 808 if the input 810 is, for example, sampled high. The memory device 110 can also leave the data 806 or the data 808 as non-inverted if the input 810 is, for example, sampled low.

If the masked-write functionality is enabled at the memory device 110 (e.g., the memory device 110 receives a masked-write command), the memory device 110 treats the input 810 as a data-mask (DM) signal. The DM signal at input 810 can indicate which bit time within the data 806 or the data 808 is to be masked. For example, when the input 810 is high, the memory device 110 can mask that bit time across all DQs associated within a byte. When the DMI signal at the input 810 is high, the DQ input signals within the byte are "don't care" (e.g., either high or low). When the DMI signal at the input is low, the memory device 110 can, for example, not perform a mask operation and the data 806 or the data 808 is written to the memory array 208.

In other implementations with smaller channel widths (e.g., ×8 DRAM), the memory device 110 can receive a portion of the ECC values 812 and 814 as part of the "data package" that includes the data 806 and 808, respectively, and that are propagated over the DQ bus 122. In a 126:10 ECC configuration enabled by the host device 104 at an Mode Register (MR) register, the host device 104 can provide an 8-bit ECC value on the read strobe line (RDQS_t) and provide an additional 2 bits of the ECC value as part of the communicated data that is transmitted over the DQ bus 122. In this way, the host device 104 provides 126-bit data and a 10-bit ECC value to the memory device 110 for a total of 136 bits (e.g., a 16 burst length over an 8-bit DQ bus plus 8 bits on the read strobe line). The shared ECC engine 506 can then use the data and the (concatenated or otherwise combined) ECC value to perform ECC determinations. As described above, the MR register can enable the additional use of, for instance, 12-bit, 14-bit, and 16-bit ECC values in a similar manner in a 124:12, 122:14, and 120:16 ECC configuration.

Alternatively, if the masked-write enablement register 402 is set to enable masked-write functionality (e.g., by setting the value to "1"), the ECC values 812 and 814 have 8 bits apiece with ×8 DRAM. In such situations, the ECC engines 406 perform a similar set of operations with the data 806 and 808, which can be 128-bit, and the ECC values 812 and 814, respectively, as are described above with respect to the shared ECC engine 408. The configurable ECC circuitry 112 uses the respective ECC engine 406 that is proximate to the respective memory bank 404 in which the data 806 (or the data 808) are to be stored. The masked-write circuitry can also use information provided over the DMI bus interface to perform the masked-write operations with respect to the data 806 and 808.

The timing diagram 900 of FIG. 9 is described in conjunction with at least one read command. At 902, the memory device 110 receives a first read command (RD) that targets data 906 and is associated with the corresponding address (not illustrated). At 904, a second read command (RD) is received that targets data 908 and is associated with the corresponding address thereof. The host device 104 can transmit the read commands 902 and 904 over the interconnect 106 to the memory device 110, and the memory device

110 can receive the read commands 902 and 904 via the CA bus 120. In response to read strobes (e.g., on the read strobe line RDQS), the control circuitry 210 reads out the data 906 and the data 908 after the read latency (RL).

The configurable ECC circuitry 112, which can selectively employ the ECC engines 406 or the shared ECC engine 408, performs ECC determinations on the data 906 and the data 908 using two respective ECC values. The configurable ECC circuitry 112 can report results of ECC determinations to the host device 104 in multiple ways, two of which are shown in FIG. 9: ECC #1 and ECC #2. In particular, the configurable ECC circuitry 112 regenerates respective ECC values based on the data 906 and the data 908. The configurable ECC circuitry 112 then compares the regenerated ECC values to the stored ECC values. If the respective regenerated and stored ECC values associated with the data 906 match (e.g., are the same), the memory device 110 sends the data 906 and the ECC value 910 to the host device 104 as shown for a first example ECC implementation-ECC #1. The memory device 110 can transmit the ECC value 910 over the interconnect 106 to the host device 104 using, for instance, the DMI pin. Similarly, if the respective regenerated and stored ECC values associated with the data 908 match (e.g., are the same), the memory device 110 sends the data 908 via the DQ bus 122 and the ECC value 912 via the DMI pin to the host device 104. The host device 104 can use the ECC values 910 and 912 to perform ECC determinations on the data 906 and the data 908 that are received over the DQ bus 122, e.g., as a form of providing ECC over the interconnect 106.

In the timing diagram 900, the illustrated ECC values 910 and 912 are 16-bits and processed by the shared ECC engine 408. In other implementations, the ECC values 910 and 912 can be 8-bit, 10-bit, 12-bit, 14-bit, or some other bit size. Some of these implementations can pertain to byte-mode operations in which an ECC length is set using a mode register (MR) as described above. If the ECC values 910 and 912 are 8-bit, then the local ECC engines 406 can perform the ECC determinations. If the ECC values have a larger bit size, then the shared ECC engine 408 can perform the ECC determinations. Responsive to the ECC values 910 and 912 having a quantity of bits fewer than 16, the configurable ECC circuitry 112 can pad the transmission with "don't care" bits, dummy bits, or other information at a designated position (e.g., before or after the ECC values).

The timing diagram 900 illustrates operations of the memory device 110 in response to a read command. After performing the ECC determinations, the configurable ECC circuitry 112 can alternatively send error flags 914 and 916 along with the data 906 and 908, respectively. An example error flag implementation is depicted a second example ECC implementation, ECC #2. The error flags 914 and 916 can be driven either high or low. A high error flag can indicate, for example, that there was an uncorrected or uncorrectable error detected with the respective data. A low error flag can indicate, for example, that no error was detected or an error was corrected with respect to the data. In this way, the memory device 110 and specifically the configurable ECC circuitry 112 can indicate the presence or absence of a detected error with the respective data (e.g., the data 906 or the data 908) provided to the host device 104, but the host device 104 does not itself need to perform an ECC determination on the data.

Example Methods

Figure 11:
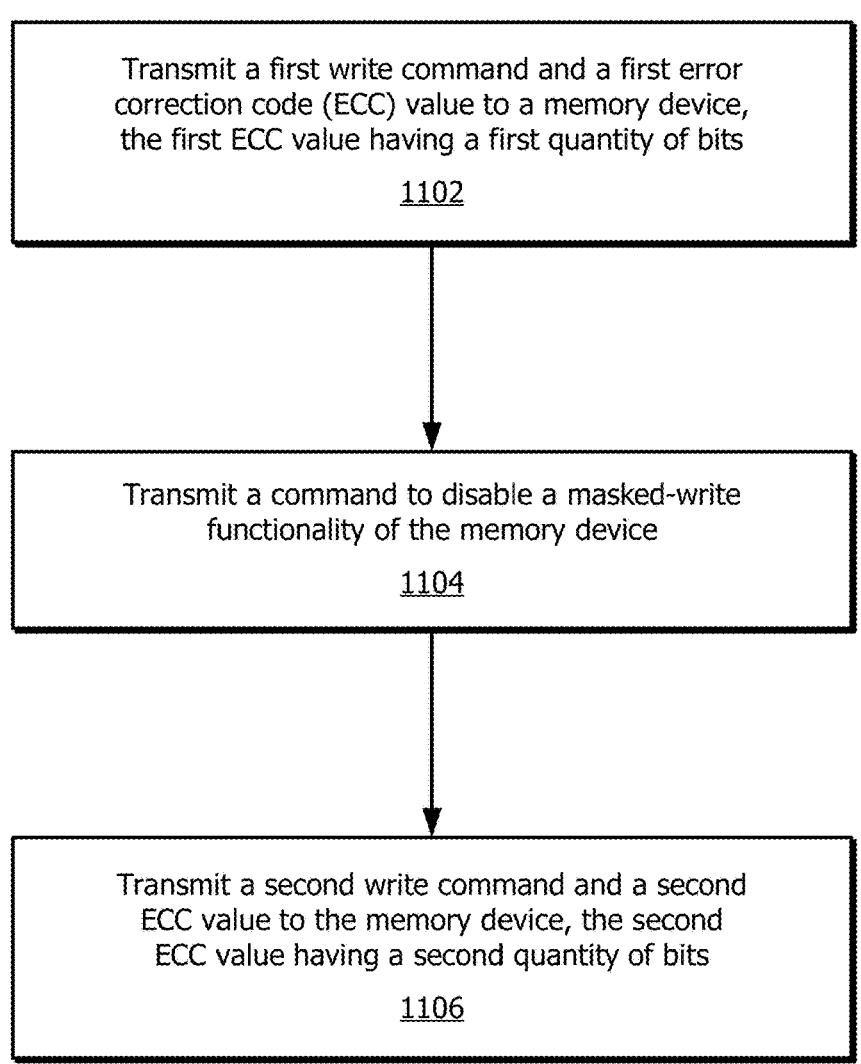
Figure 12:
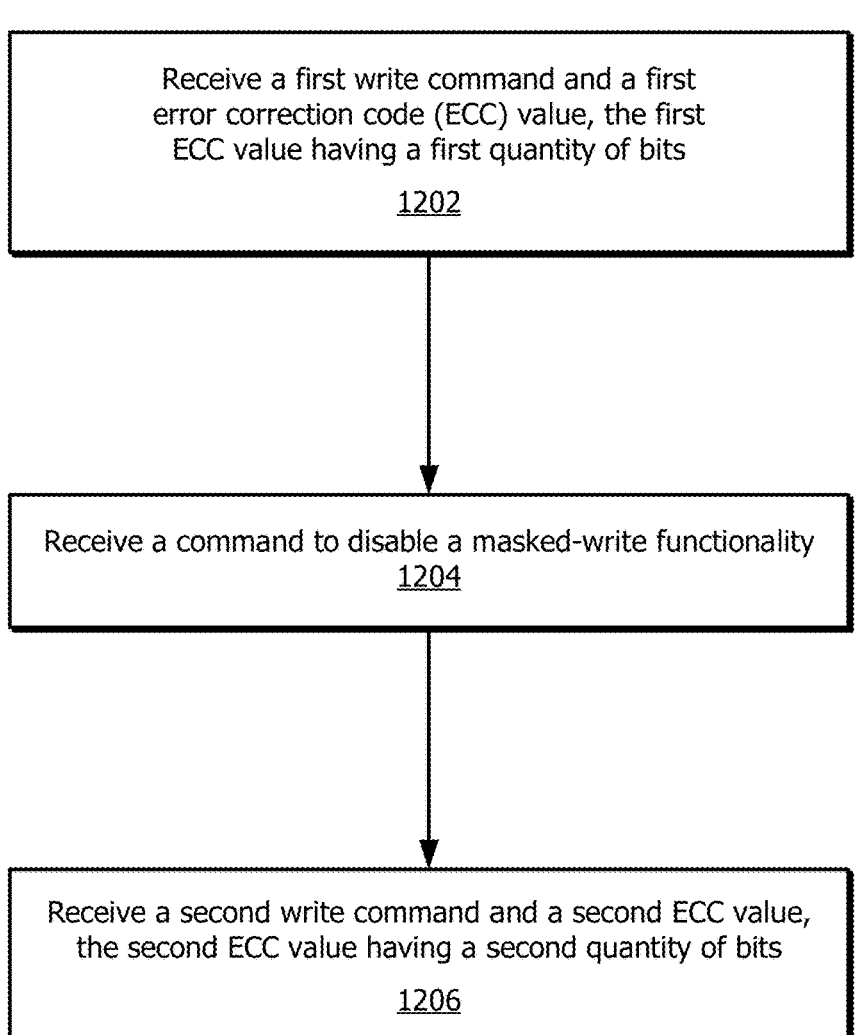

This section describes example methods with reference to the flow chart(s) and flow diagram(s) of FIGS. 10 through 12 for implementing configurable ECC circuitry and schemes.

These descriptions may also refer to components, entities, and other aspects depicted in FIGS. 1 through 9, which reference is made only by way of example.

FIG. 10 illustrates a flow diagram for an example process 1000 that implements configurable ECC circuitry and schemes across multiple write commands from the perspective of a memory device 110 or a memory module 302. At block 1002, an apparatus is determining, by a first ECC engine, a first ECC value based on first data. For example, an apparatus 102 can operate a package (e.g., a memory module 302 or one or more dies 304 combined into a chip carrier), including one or more dies 304 in an architecture 400 through 740 that implements the configurable ECC circuitry 112. Here, a memory die 304 of the one or more memory dies 304-1 to 304-D (where "D" is one or greater) includes multiple memory banks 404-1 to 404-B (where "B" is two or greater). The ECC engine 406-1L of the apparatus 102 can determine the ECC value 412-1 based on the data 410-1. The data 410-1 can be received from an interface for the memory die 304. In this example, the ECC determination for block 1002 is performed in a memory architecture that has enabled use of the masked-write command (e.g., a corresponding mode register (MR) has been set). The memory die 304 can receive a command to enable masked-write functionality for the multiple memory banks 404. In response, the memory die 304 can enable the masked-write functionality for the multiple memory banks 404 (e.g., by setting the MR). The ECC value 412-1 can have a first quantity of bits (e.g., 8). The ECC engine 406-1L corresponds to the memory bank 404-1L by being capable of making ECC determinations for data being stored in the memory bank 404-1L.

At block 1004, an apparatus is writing the first ECC value to a first memory bank. For example, access control logic for the memory array or the ECC engine 406-1L can write the ECC value 412-1 to the memory bank 404-1L, or in association therewith, via a first data path 604-1 on the memory die 304. The access control logic or the ECC engine 406-1L can also write the data 410-1 to the memory bank 404-1L.

At block 1006, an apparatus is determining, by a second ECC engine, a second ECC value based on second data. For example, the ECC engine 406-1R of the apparatus 102 can determine another ECC value 412 based on other data 410. The other data 410 can be received from the interface for the memory die 304. In this example, the ECC determination of the block 1006 is performed in a memory architecture that has enabled use of the masked-write command. The other ECC value 412 can also have the first quantity of bits (e.g., 8). The ECC engine 406-1R corresponds to the memory bank 404-1R.

At block 1008, an apparatus is writing the second ECC value to a second memory bank. For example, the ECC engine 406-1R can write the other ECC value 412 to the memory bank 404-1R, or in association therewith, via a second data path 604-2 on the memory die 304. The same or different access control logic or the ECC engine 406-1R can write the other data 410 to the memory bank 404-1R.

At block 1010, an apparatus is determining, by a third ECC engine, a third ECC value based on third data. For example, the shared ECC engine 408 of the apparatus 102 can determine the ECC value 412-2 based on the data 410-2. The data 410-2 can be received from the interface for the memory die 304. In this example, the ECC determination is performed in the memory architecture that has disabled use of the masked-write command (e.g., a corresponding MR has been cleared). The memory die 304 can receive a command to disable masked-write functionality for the multiple memory banks 404. In response, the memory die 304 can disable the masked-write functionality for the multiple memory banks 404 (e.g., by clearing the MR). The ECC value 412-2 can have a second quantity of bits (e.g., 16). The second quantity of bits is larger than the first quantity of bits. The shared ECC engine 408 is operatively coupled to the memory array 208, including the memory banks 404-1L and 404-1R.

At block 1012, an apparatus is writing a first portion of the third ECC value to the first memory bank and a second portion of the third ECC value to the second memory bank. For example, the shared ECC engine 408 can write a portion of the ECC value 412-2 to the memory bank 404-1L and another portion to the memory bank 404-1R via two or more other data paths. In particular, the shared ECC engine 408 can write a first portion of the ECC value 412-2 to the memory bank 404-1L and a second portion of the ECC value 412-2 to the memory bank 404-2B.

The process 1000 can also include reading fourth data from the first memory bank. For example, the ECC engine 406-1L can read fourth data 410 from the memory bank 404-1L. The ECC engine 406-1L can also read a stored ECC value 412 from the memory bank 404-1L. The ECC engine 406-1L can determine a fourth ECC value 412 based on the fourth data 410.

The process 1000 can further include reading fifth data from the first memory bank and the second memory bank. For example, the shared ECC engine 408 can read respective portions of the fifth data 410 from the memory banks 404-1L and 404-1R. The shared ECC engine can also read another stored ECC value 412 associated with the fifth data 410 from the memory banks 404-1L and 404-1R. The other stored ECC value 412 can be stored as split portions at the memory banks 404-1L and 404-1R, and the shared ECC engine 408 can concatenate or otherwise combine the portions to reform the other stored ECC value 412. The shared ECC engine 408 can then determine a fifth ECC value 412 based on the fifth data 410. The shared ECC engine 408 can verify the reliability of the fifth data 410 or detect at least one error therein based on the other stored ECC value 412 and the fifth ECC value 412. The memory die 304 can then transmit the fifth ECC value 412 or signal the fifth data 410 has no detected errors based on the verifying.

FIG. 11 illustrates a flow diagram for an example process 1100 that implements configurable ECC circuitry and schemes for a write command from the perspective of a host device 104. At block 1102, an apparatus is transmitting a first write command and a first ECC value to a memory device. The first ECC value has a first quantity of bits. For example, the host device 104 of the apparatus 102 can transmit a write command and an ECC value 412-1 to the memory device 110 or the memory module 302. The ECC value 412-1 can have a first quantity of bits, including, for example, 8 bits. The host device 104 can also transmit the data 410-1 to the memory device 110 or the memory module 302. The data 410-1 can have a third quantity of bits (e.g., 128 bits). The ECC value 412-1 is based on the data 410-1.

At block 1104, the apparatus is transmitting a command to disable a masked-write functionality of the memory device. For example, the host device 104 can transmit a command to disable the masked-write functionality of the memory device 110 or the memory module 302. More generally, the host device 104 can transmit a command to adjust (e.g., disable or enable) a masked-write mode of the memory device 110 or the memory module 302.

At block 1106, the apparatus is transmitting a second write command and a second ECC value to the memory device. The second ECC value has a second quantity of bits, which is larger than the first quantity. For example, the host device 104 can transmit another write command and the ECC value 412-2 to the memory device 110 or the memory module 302. The ECC value 412-2 can have a second quantity of bits, including, for example, 16 bits, responsive to the command that changes the masked-write functionality mode (e.g., that disables the masked-write functionality) of the memory device 110 or the memory module 302. The second quantity of bits (e.g., 16 bits) is larger than the first quantity of bits (e.g., 8 bits). In other implementations, the second quantity of bits can include 10, 12, 14, or 16 bits. The host device 104 can also transmit the data 410-2 to the memory device 110 or the memory module 302. The ECC value 412-2 is based on the data 410-2. The data 410-2 can have a fourth quantity of bits (e.g., 256 bits), which can be larger than the third quantity of bits (e.g., 128 bits). In the other implementations, the fourth quantity of bits (e.g., 126, 124, 122, or 120 bits) can be smaller than the third quantity of bits (e.g., 128 bits). A portion of the communicated data that includes the data 410-2 and is transmitted on the DQ bus 120 can include additional bits for the ECC value 412-2 (e.g., beyond 8 bits). The sum of the second quantity of bits and the fourth quantity of bits equals 136.

FIG. 12 illustrates a flow diagram for an example process 1200 that implements configurable ECC circuitry and schemes for a write command from the perspective of a memory device 110 or a memory module 302. At block 1202, a memory device of an apparatus is receiving a first write command and a first ECC value. The first ECC value has a first quantity of bits. For example, the memory device 110 or the memory module 302 of the apparatus 102 can receive a write command and an ECC value 412-1 from the host device 104. The ECC value 412-1 can have a first quantity of bits, including, for example, 8 bits. The memory device 110 or the memory module 302 can also receive data 410-1 that has a third quantity of bits (e.g., 128 bits). The ECC value 412-1 is based on the data 410-1.

At block 1204, the memory device of the apparatus is receiving a command to disable a masked-write functionality in the memory device. For example, the memory device 110 or the memory module 302 can receive a command to disable the masked-write functionality. The command to disable the masked-write functionality can cause the memory device 110 or the memory module 302 to write a low value (e.g., "0") at the masked-write enablement register 402. More generally, the host device 104 can transmit a command to adjust (e.g., disable or enable) a masked-write mode of the memory device 110 or the memory module 302.

At block 1206, the memory device of the apparatus is receiving a second write command and a second ECC value. The second ECC value has a second quantity of bits, which is larger than the first quantity. For example, the memory device 110 or the memory module 302 can receive another write command and the ECC value 412-2. The ECC value 412-2 can have a second quantity of bits, including, for example, 16 bits. The memory device 110 or the memory module 302 can also receive data 410-2 that has a fourth quantity of bits (e.g., 126, 124, 122, or 120 bits). The ECC value 412-2 is based on the data 410-2.

The second quantity of bits (e.g., 16 bits) is different (e.g., larger) than the first quantity of bits (e.g., 8 bits) responsive to the command that changes the masked-write functionality mode (e.g., that disables the masked-write functionality) of the memory device 110 or the memory module 302. Here, the fourth quantity of bits (e.g., 256 bits) can be larger than the third quantity of bits (e.g., 128 bits). In other implementations, the second quantity of bits can include 10, 12, or 14 bits. The fourth quantity of bits can be smaller than the third quantity of bits. A portion of the communicated data that includes the data 410-2 and is transmitted on the DQ bus 120 can include additional bits for the ECC value 412-2. The sum of the second quantity of bits and the fourth quantity of bits equals 136 in these other implementations.

The process 1200 can further include the memory device 110 or the memory module 302 receiving a first read command for data 410-2 from the host device 104. The memory device 110 or the memory module 302 can verify, using the shared ECC engine 408 and based on a third ECC value 412, the data 410-2 that is read from the memory bank 404-1L and the memory bank 404-2L of the multiple memory banks 404. In the other implementations, the data 410-2 can be read from the memory bank 404-1L. The third ECC value 412 has the second quantity of bits. The memory device 110 or the memory module 302 can then transmit the data 410-2 to the host device 104 responsive to verifying the data 410-2. The memory device 110 or the memory module 302 can also transmit the third ECC value 412 or signal that the data 410-2 has or does not have detected errors based on the verifying.

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 through 9, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Examples of multiple implementations are described in the following paragraphs.

Example 1: An apparatus comprising: at least one memory array comprising multiple memory banks; and error correction code (ECC) circuitry coupled to the multiple memory banks, the ECC circuitry comprising: a first ECC engine corresponding to a first memory bank of the multiple memory banks; a second ECC engine corresponding to a second memory bank of the multiple memory banks; and a third ECC engine corresponding to the first memory bank and the second memory bank of the multiple memory banks.

Example 2: The apparatus of claim 1, wherein: the first ECC engine is configured to provide ECC determinations for the first memory bank of the multiple memory banks; the second ECC engine is configured to provide ECC determinations for the second memory bank of the multiple memory banks; and the third ECC engine is configured to provide ECC determinations for the first memory bank and the second memory bank of the multiple memory banks.

Example 3: The apparatus of example 1 or example 2, wherein: the first ECC engine is configured to provide a first ECC value for the first memory bank of the multiple memory banks, the first ECC value having a first quantity of bits; the second ECC engine is configured to provide a second ECC value for the second memory bank of the multiple memory banks, the second ECC value having the first quantity of bits; and the third ECC engine is configured to provide a third ECC value for at least one of the first memory bank or the second memory bank of the multiple memory banks, the third ECC value having a second quantity of bits, the second quantity of bits larger than the first quantity of bits.

Example 4: The apparatus of any one of the preceding examples, wherein the first quantity of bits is eight bits, and the second quantity of bits is sixteen bits.

Example 5: The apparatus of any one of the preceding examples, wherein: the first ECC engine is configured to provide ECC determinations for the first memory bank of the multiple memory banks for read operations and write operations; the second ECC engine is configured to provide ECC determinations for the second memory bank of the multiple memory banks for read operations and write operations; and the third ECC engine is configured to provide ECC determinations for the first memory bank and the second memory bank of the multiple memory banks for read operations and write operations.

Example 6: The apparatus of any one of the preceding examples, wherein the memory array is configurable to enable or disable a masked-write functionality.

Example 7: The apparatus of any one of the preceding examples, further comprising: control circuitry configured to disable the masked-write functionality based on a command to disable the masked-write functionality that precludes use of a masked-write command.

Example 8: The apparatus of any one of the preceding examples, wherein the masked-write command corresponds to an internal read-modify-write operation.

Example 9: The apparatus of any one of the preceding examples, wherein: the control circuitry is configured to enable the masked-write functionality based on another command to enable the masked-write functionality.

Example 10: The apparatus of any one of the preceding examples, wherein: the first ECC engine or the second ECC engine is configured to provide ECC determinations for the first memory bank and the second memory bank, respectively, of the multiple memory banks responsive to the other command to enable the masked-write functionality; and the third ECC engine is configured to provide ECC determinations for the first memory bank and the second memory bank of the multiple memory banks responsive to the command to disable the masked-write functionality.

Example 11: The apparatus of any one of the preceding examples, wherein: the first ECC engine is configured to provide a first ECC value for the first memory bank of the multiple memory banks, the first ECC value having a first quantity of bits; the second ECC engine is configured to provide a second ECC value for the second memory bank of the multiple memory banks, the second ECC value having the first quantity of bits; and the third ECC engine is configured to provide a third ECC value for at least one of the first memory bank or the second memory bank of the multiple memory banks, the third ECC value having a second quantity of bits, the second quantity of bits larger than the first quantity of bits.

Example 12: The apparatus of any one of the preceding examples, further comprising: an interface coupled to the at least one memory array, wherein the first ECC engine, the second ECC engine, and the third ECC engine are coupled between the interface and the multiple memory banks.

Example 13: The apparatus of any one of the preceding examples, wherein the third ECC engine is disposed between the interface and the multiple memory banks.

Example 14: The apparatus of any one of the preceding examples, further comprising: one or more dies, wherein: a single die of the one or more dies comprises the at least one memory array and the ECC circuitry; the ECC circuitry is coupled to each memory bank of the multiple memory banks of the single die; the first ECC engine is configured to provide ECC determinations for the first memory bank of the multiple memory banks of the single die; the second ECC engine is configured to provide ECC determinations for the second memory bank of the multiple memory banks of the single die; and the third ECC engine is configured to provide ECC determinations for each memory bank of the multiple memory banks of the single die.

Example 15: The apparatus of any one of the preceding examples, wherein: the single die comprises an interface configured to be coupled to an interconnect that is external to the single die, the interface coupled to the at least one memory array; and at least a portion of the ECC circuitry is coupled between the interface and the multiple memory banks of the single die.

Example 16: The apparatus of any one of the preceding examples, wherein the at least one memory array comprises synchronous dynamic random-access memory (SDRAM) configured as a memory module with one channel containing either 16 or 8 data (DQ) signals, double-data-rate input/output (I/O) signaling, and supporting a supply voltage of 0.3 to 0.5V.

Example 17: The apparatus of any one of the preceding examples, further comprising: multiple data paths, wherein: the first ECC engine is coupled to the first memory bank of the multiple memory banks via a first data path of the multiple data paths; the second ECC engine is coupled to the second memory bank of the multiple memory banks via a second data path of the multiple data paths; and the third ECC engine is coupled to the first memory bank and the second memory bank of the multiple memory banks via two or more other data paths of the multiple data paths.

Example 18: The apparatus of any one of the preceding examples, further comprising: a memory module including multiple dies, wherein one of the multiple dies comprises the at least one memory array.

Example 19: A method comprising: determining, by a first error correction code (ECC) engine, a first ECC value based on first data; writing the first ECC value to a first memory bank; determining, by a second ECC engine, a second ECC value based on second data; writing the second ECC value to a second memory bank; determining, by a third ECC engine, a third ECC value based on third data; and writing a first portion of the third ECC value to the first memory bank and a second portion of the third ECC value to the second memory bank.

Example 20: The method of example 19, wherein: the first ECC value and the second ECC value have a first quantity of bits; and the third ECC value has a second quantity of bits, the second quantity of bits larger than the first quantity of bits.

Example 21: The method of example 19 or example 20, wherein the first quantity of bits is eight bits, and the second quantity of bits is sixteen bits.

Example 22: The method of any one of the preceding examples, further comprising: performing the determining of the first ECC value and the determining of the second ECC value in a memory mode in which use of a masked-write command is enabled; and performing the determining of the third ECC value in a memory mode in which use of the masked-write command is disabled.

Example 23: The method of any one of the preceding examples, further comprising: receiving a command to enable masked-write functionality for multiple memory banks that comprise the first memory bank and the second memory bank; and enabling the masked-write functionality for the multiple memory banks responsive to receiving the command.

Example 24: The method of any one of the preceding examples, further comprising: receiving another command to disable the masked-write functionality for the multiple memory banks; and disabling the masked-write functionality for the multiple memory banks responsive to receiving the other command.

Example 25: The method of any one of the preceding examples, wherein: the first ECC engine determines the first ECC value or the second ECC engine determines the second ECC value in the memory mode in which use of the masked-write command is enabled; and the third ECC engine determines the third ECC value in the memory mode in which use of the masked-write command is disabled.

Example 26: The method of any one of the preceding examples, further comprising: writing the first data to the first memory bank; writing the second data to the second memory bank; and writing a first portion of the third data to the first memory bank and a second portion of the third data to the second memory bank.

Example 27: The method of any one of the preceding examples, further comprising: receiving the first data via an interface of a die of a memory module; receiving the second data via the interface of the die of the memory module; and receiving the third data via the interface of the die of the memory module.

Example 28: The method of any one of the preceding examples, further comprising: reading fourth data from the first memory bank; determining, by the first ECC engine, a fourth ECC value based on the fourth data; reading a first portion of fifth data from the first memory bank and a second portion of the fifth data from the second memory bank; and determining, by the third ECC engine, a fifth ECC value based on the fifth data.

Example 29: The method of any one of the preceding examples, further comprising: reading a first portion of a stored ECC value from the first memory bank and a second portion of the stored ECC value from the second memory bank, the stored ECC value associated with the fifth data; and determining, by the third ECC engine and based on the stored ECC value and the fifth ECC value, that the fifth data includes at least one error.

Example 30: The method of any one of the preceding examples, further comprising: reading a first portion of a stored ECC value from the first memory bank and a second portion of the stored ECC value from the second memory bank, the stored ECC value associated with the fifth data; and determining, by the third ECC engine and based on the stored ECC value and the fifth ECC value, that the stored ECC value matches the fifth ECC value.

Example 31: The method of any one of the preceding examples, further comprising: transmitting, from a memory module, the fifth ECC value or the stored ECC value; or signaling, by the memory module, that no error was determined for the fifth data based on the determining that the stored ECC value matches the fifth ECC value.

Example 32: The method of any one of the preceding examples, further comprising: writing the first ECC value to the first memory bank via a first data path disposed on a die; writing the second ECC value to the second memory bank via a second data path disposed on the die; and writing the first portion of the third ECC value to the first memory bank and the second portion of the third ECC value to the second memory bank via two or more other data paths.

Example 33: An apparatus comprising: at least one memory array comprising multiple memory banks; and error correction code (ECC) circuitry coupled to the multiple memory banks, the ECC circuitry comprising multiple ECC engines and configured to: provide, by a first ECC engine of the multiple ECC engines, a first ECC value to a first memory bank of the multiple memory banks, the first ECC value comprising a first quantity of bits, the first ECC engine corresponding to the first memory bank of the multiple memory banks; and provide, by a second ECC engine of the multiple ECC engines, a second ECC value to the first memory bank of the multiple memory banks, the second ECC value comprising a second quantity of bits larger than the first quantity of bits, the second ECC engine corresponding to at least two memory banks of the multiple memory banks.

Example 34: The apparatus of example 33, wherein: the first ECC engine is configured to provide ECC determinations for the first memory bank of the multiple memory banks; and the second ECC engine is configured to provide ECC determinations for the at least two memory banks of the multiple memory banks.

Example 35: The apparatus of example 33 or example 34, wherein: the first quantity of bits is eight bits; and the second quantity of bits is at least one of ten bits, twelve bits, fourteen bits, or sixteen bits.

Example 36: The apparatus of any one of the preceding examples, further comprising: control circuitry configured to set the second quantity of bits based on a command indicative of the second quantity of bits.

Example 37: The apparatus of any one of the preceding examples, wherein the control circuitry comprises a mode register configured to store a value indicative of the second quantity of bits.

Example 38: The apparatus of any one of the preceding examples, further comprising: control circuitry configured to disable or enable a masked-write functionality based on a command to disable or a command to enable, respectively, the masked-write functionality.

Example 39: The apparatus of any one of the preceding examples, wherein: the first ECC value is based on first data, the first data having a third quantity of bits; and the second ECC value is based on second data, the second data having a fourth quantity of bits smaller than the third quantity of bits.

Example 40: The apparatus of any one of the preceding examples, wherein: the third quantity of bits is 128 bits; and the fourth quantity of bits is at least one of 126 bits, 124 bits, 122 bits, or 120 bits.

Example 41: The apparatus of any one of the preceding examples, further comprising: control circuitry configured to disable or enable a byte-mode functionality.

Example 42: A method comprising: transmitting a first write command and a first error correction code (ECC) value to a memory module, the first ECC value having a first quantity of bits; transmitting a command to disable a masked-write functionality of the memory module; and transmitting a second write command and a second ECC value to the memory module, the second ECC value having a second quantity of bits, the second quantity of bits larger than the first quantity of bits responsive to the command to disable the masked-write functionality of the memory module.

Example 43: The method of example 42, further comprising: transmitting first data to the memory module, the first data having a third quantity of bits, the first ECC value based on the first data; and transmitting second data to the memory module, the second data having a fourth quantity of bits, the fourth quantity of bits being larger than the third quantity of bits, the second ECC value based on the second data.

Example 44: The method of example 42 or example 43, wherein: the first quantity of bits is eight bits; the second quantity of bits is sixteen bits; the third quantity of bits is 128 bits; and the fourth quantity of bits is 256 bits.

Example 45: The method of any one of the preceding examples, further comprising: transmitting first data to the memory module, the first data having a third quantity of bits, the first ECC value based on the first data; and transmitting second data to the memory module, the second data having a fourth quantity of bits, the fourth quantity of bits being smaller than the third quantity of bits, the second ECC value based on the second data and including multiple bits communicated with the second data.

Example 46: The method of any one of the preceding examples, wherein: the first quantity of bits is eight bits; the second quantity of bits is ten bits, twelve bits, fourteen bits, or sixteen bits; the third quantity of bits is 128 bits; the fourth quantity of bits is 126 bits, 124 bits, 122 bits, or 120 bits; and a sum of the second quantity of bits and the fourth quantity of bits equals 136 bits.

Example 47: A method comprising: receiving, by a memory module, a first write command and a first error correction code (ECC) value, the first ECC value having a first quantity of bits; receiving, by the memory module, a command to disable a masked-write functionality; and receiving, by the memory module, a second write command and a second ECC value, the second ECC value having a second quantity of bits, the second quantity of bits larger than the first quantity of bits responsive to the command to disable the masked-write functionality.

Example 48: The method of example 47, further comprising: receiving, by the memory module, a first read command for first data, a first portion of the first data stored in a first memory bank of multiple memory banks of the memory module and a second portion of the first data stored in a second memory bank of the multiple memory banks; verifying, by the memory module and based on a third ECC value, the first data, the third ECC value having the second quantity of bits; and transmitting, from the memory module, the first data to a host device responsive to verifying the first data.

Example 49: The method of example 47 or example 48, further comprising: transmitting, from the memory module, the third ECC value; or signaling, by the memory module, that no error was determined for the first data based on the verifying.

Example 50: The method of any one of the preceding examples, further comprising: receiving, by the memory module, first data having a third quantity of bits, the first ECC value based on the first data; and receiving, by the memory module, second data having a fourth quantity of bits, the fourth quantity of bits being smaller than the third quantity of bits, the second ECC value based on the second data and including multiple bits communicated with the second data.

Example 51: The method of any one of the preceding examples, further comprising: receiving, by the memory module, a first read command for third data, the third data stored in a first memory bank of multiple memory banks of the memory module and having the fourth quantity of bits; verifying, by the memory module and based on a third ECC value, the third data, the third ECC value having the second quantity of bits; and transmitting, from the memory module, the third data to a host device responsive to verifying the third data.

Example 52: The method of any one of the preceding examples, wherein: the first quantity of bits is eight bits; the second quantity of bits is ten bits, twelve bits, fourteen bits, or sixteen bits; the third quantity of bits is 128 bits; the fourth quantity of bits is 126 bits, 124 bits, 122 bits, or 120 bits; and a sum of the second quantity of bits and the fourth quantity of bits equals 136 bits.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although this document describes implementations for configurable ECC circuitry and schemes in language specific to certain features or methods, the subject of the appended claims is not limited to the described features or methods.

Instead, this document discloses the described features and methods as example implementations for configurable ECC circuitry and schemes.

What is claimed is:

1. An apparatus comprising:
at least one memory array comprising multiple memory banks;
at least one mode register configured to store a value indicative of a quantity of bits of communicated information that are allocated as error correction code (ECC) bits; and
ECC circuitry coupled to the multiple memory banks and the at least one mode register, the ECC circuitry comprising multiple ECC engines and configured to:
provide, by a first ECC engine of the multiple ECC engines, a first ECC value to a first memory bank of the multiple memory banks, the first ECC engine corresponding to the first memory bank; and
provide, by a second ECC engine of the multiple ECC engines, a second ECC value to the first memory bank based on the value stored in the at least one mode register, the second ECC engine corresponding to the first memory bank and at least one other memory bank of the multiple memory banks.

2. The apparatus of claim 1, further comprising:
an interface coupled to the ECC circuitry, the interface configured to:
receive, on a first bus, data and a first portion of multiple bits of an ECC value corresponding to the data, a quantity of bits of the first portion of the multiple bits of the ECC value equal to the quantity of bits of communicated information that are allocated as ECC bits; and
receive, on a second bus, a second portion of the multiple bits of the ECC value corresponding to the data.

3. The apparatus of claim 2, wherein the ECC circuitry is configured to:
store the data in the first memory bank at a location allocated to data storage and at an address corresponding to the data;
store the first portion of the multiple bits of the ECC value corresponding to the data in the first memory bank at the location allocated to data storage and at the address corresponding to the data; and
store the second portion of the multiple bits of the ECC value corresponding to the data in the first memory bank at another location allocated to ECC value storage and at the address corresponding to the data.

4. The apparatus of claim 1, wherein the ECC circuitry is configured to:
retrieve, from a first location of the first memory bank, data;
retrieve, from the first location of the first memory bank, a first portion of multiple bits of an ECC value corresponding to the data, a quantity of bits of the first portion of the multiple bits of the ECC value equal to the quantity of bits of communicated information that are allocated as ECC bits;
retrieve, from a second location of the first memory bank, a second portion of the multiple bits of the ECC value corresponding to the data, the second location different from the first location;
combine the first portion of the multiple bits of the ECC value corresponding to the data and the second portion of the multiple bits of the ECC value corresponding to the data to produce reformed multiple bits of the ECC value; and perform an ECC determination using the data and the reformed multiple bits of the ECC value.

5. A method comprising:

receiving, by a memory device, a command indicative of a quantity of multiple bits for error correction code (ECC) values for a quantity of bits of data;

receiving, by the memory device on a first bus, data and a first portion of multiple bits of an ECC value corresponding to the data; and receiving, by the memory device on a second bus, a second portion of the multiple bits of the ECC value corresponding to the data.

6. The method of claim 5, wherein:

the first portion of the multiple bits of the ECC value corresponding to the data comprises a first quantity of ECC bits;

the second portion of the multiple bits of the ECC value corresponding to the data comprises a second quantity of ECC bits; and the quantity of multiple bits for ECC values for the quantity of bits of data is equal to a sum of the first quantity of ECC bits and the second quantity of ECC bits.

7. The method of claim 6, wherein:

the first bus comprises a data bus coupled between the memory device and a host device; and the second bus comprises a read strobe line coupled between the memory device and the host device.

8. The method of claim 5, further comprising:

writing, by the memory device, a value in at least one mode register responsive to the receiving of the command, the value indicative of the quantity of multiple bits for ECC values for the quantity of bits of data.

9. The method of claim 8, further comprising:

receiving, by the memory device from a host device, a mode register write command to activate a byte mode at the memory device; and writing, by the memory device, another value in at least one other mode register responsive to the receiving of the mode register write command, the other value indicative that the byte mode is active at the memory device.

10. The method of claim 5, further comprising:

determining, by the memory device, a determined ECC value based on the received data;

comparing, by the memory device, the determined ECC value to the first portion and the second portion of the multiple bits of the ECC value corresponding to the data; and performing, by the memory device, an operation based on the comparing.

11. The method of claim 10, wherein the performing comprises at least one of:

correcting, by the memory device, a detected error in the data using the data, the first portion of the multiple bits of the ECC value corresponding to the data, and the second portion of the multiple bits of the ECC value corresponding to the data; or storing, by the memory device in at least one memory array, the data, the first portion of the multiple bits of the ECC value corresponding to the data, and the second portion of the multiple bits of the ECC value corresponding to the data.

12. The method of claim 5, further comprising:

storing, by the memory device, the data in at least one memory array at a location allocated to data storage and at an address corresponding to the data;

storing, by the memory device, the first portion of the multiple bits of the ECC value corresponding to the data in the at least one memory array at the location allocated to data storage and at the address corresponding to the data; and storing, by the memory device, the second portion of the multiple bits of the ECC value corresponding to the data in the at least one memory array at another location allocated to ECC value storage and at the address corresponding to the data.

13. A method comprising:

transmitting, by a host device, a command indicative of a quantity of multiple bits for error correction code (ECC) values for a quantity of bits of data;

transmitting, by the host device on a first bus, data and a first portion of multiple bits of an ECC value corresponding to the data; and transmitting, by the host device on a second bus, a second portion of the multiple bits of the ECC value corresponding to the data.

14. The method of claim 13, wherein:

the first bus comprises a data bus coupled between the host device and a memory device.

15. The method of claim 14, wherein:

the second bus comprises a read strobe line coupled between the host device and the memory device.

16. The method of claim 13, wherein the transmitting of the command indicative of the quantity of multiple bits for ECC values comprises:

transmitting, by the host device to a memory device, a mode register write command to write a value in at least one mode register of the memory device, the value indicative of the quantity of multiple bits for ECC values for the quantity of bits of data.

17. The method of claim 13, wherein:

the first portion of the multiple bits of the ECC value corresponding to the data comprises a first quantity of ECC bits;

the second portion of the multiple bits of the ECC value corresponding to the data comprises a second quantity of ECC bits; and the quantity of multiple bits for ECC values for the quantity of bits of data is equal to a sum of the first quantity of ECC bits and the second quantity of ECC bits.

18. The method of claim 17, wherein:

the sum of the first quantity of ECC bits and the second quantity of ECC bits equals ten (10), twelve (12), or fourteen (14); and the second quantity of ECC bits is eight (8).

19. The method of claim 18, wherein:

the first quantity of ECC bits is two (2), four (4), or six (6); and the quantity of bits of data is 126, 124, or 122, respectively.

20. The method of claim 13, further comprising:

transmitting, by the host device to a memory device, a mode register write command to activate a byte mode at the memory device.

\* \* \* \* \*